(12) United States Patent
Verma

(10) Patent No.: US 12,300,247 B2
(45) Date of Patent: May 13, 2025

(54) VOICE-BASED SOCIAL NETWORK

(71) Applicant: Pramod Kumar Verma, Calabasas, CA (US)

(72) Inventor: Pramod Kumar Verma, Calabasas, CA (US)

( * ) Notice: Subject to any disclaimer, the term of this patent is extended or adjusted under 35 U.S.C. 154(b) by 467 days.

(21) Appl. No.: 17/601,428

(22) PCT Filed: Apr. 4, 2020

(86) PCT No.: PCT/US2020/026771
§ 371 (c)(1),
(2) Date: Oct. 5, 2021

(87) PCT Pub. No.: WO2020/206392
PCT Pub. Date: Oct. 8, 2020

(65) Prior Publication Data
US 2022/0208196 A1    Jun. 30, 2022

(51) Int. Cl.
*G10L 15/30* (2013.01)
*G06Q 50/00* (2024.01)
(Continued)

(52) U.S. Cl.
CPC ............. *G10L 15/30* (2013.01); *G10L 15/22* (2013.01); *G10L 15/26* (2013.01); *G06Q 50/01* (2013.01); *G10L 2015/223* (2013.01)

(58) Field of Classification Search
CPC ......... G10L 15/30; G10L 15/22; G10L 15/26; G10L 2015/223; G10L 2015/221;
(Continued)

(56) References Cited

U.S. PATENT DOCUMENTS 8,345,934 B2 * 1/2013 Obrador ................. G06V 20/30
                                                              382/168
9,336,512 B2 * 5/2016 Outerbridge ............ H04L 51/10
(Continued)

OTHER PUBLICATIONS

Maribeth Back, Jonathan Cohen, Rich Gold, Steve Harrison, and Scott Minneman. 2001. Listen Reader: An Electronically Augmented Paper-based Book. In Proceedings of the SIGCHI Conference on Human Factors in Computing Systems (CHI '01). ACM, New York, NY, USA, 23-29. DOI: http://dx.doi.org/10.1145/365024.365031.

(Continued)

*Primary Examiner* — Sheree N Brown

(57) ABSTRACT

This invention presents a novel voice-based social network, where users can compose, explore, and share voice posts. Each voice post is composed of audio, text with dictation or transcription from speech, and other optional elements such as picture, video, contact, etc. During the composition step, the user speaks to the microphone, and the system generates text using the text-to-speech method. Users optionally attach a picture or video and category. Each voice post is visualized as a text on the top of the picture as an overlay. Text is highlighted with a synced part-of the speech. Users can explore posts using search interfaces using keywords and categories. Users can also comment using voice posts. This system also provides advanced interfaces such as recommendation interface where users can see related posts, connection interface where users can connect each other, message interface where users can communicate with each other via voice messages.

20 Claims, 25 Drawing Sheets

Welcome Interface
1000

(51) Int. Cl.
      G10L 15/22          (2006.01)
      G10L 15/26          (2006.01)
(58) Field of Classification Search
      CPC .... G06Q 50/01; G06Q 30/0282; H04L 51/10;
                          H04L 51/52; G06F 3/167
      USPC ........................................................ 704/251
      See application file for complete search history.

(56) References Cited

U.S. PATENT DOCUMENTS

| | | | | |
|---|---|---|---|---|
| 10,410,108 | B2* | 9/2019 | Shaji ................. | G06F 18/24133 |
| 10,637,811 | B2* | 4/2020 | Outerbridge ......... | G06Q 10/107 |
| 2011/0206191 | A1* | 8/2011 | Tengler ................... | H04L 67/02 379/88.17 |
| 2012/0014560 | A1* | 1/2012 | Obrador ................. | G06V 20/30 382/103 |
| 2012/0209902 | A1* | 8/2012 | Outerbridge ............ | H04L 51/52 709/201 |
| 2014/0039871 | A1* | 2/2014 | Crawford ................ | G06F 40/40 704/2 |
| 2015/0052209 | A1* | 2/2015 | Vorotyntsev ............ | H04L 51/52 709/206 |
| 2015/0149321 | A1* | 5/2015 | Salameh ............ | G06Q 30/0613 705/26.41 |
| 2015/0332067 | A1* | 11/2015 | Gorod ................... | G06F 3/0484 726/26 |
| 2015/0363001 | A1* | 12/2015 | Malzbender ....... | G06V 10/7715 706/18 |
| 2017/0019363 | A1* | 1/2017 | Outerbridge ............ | H04L 51/52 |
| 2018/0039879 | A1* | 2/2018 | Shaji ...................... | G06N 3/082 |

OTHER PUBLICATIONS

Joëlle Bitton, Stefan Agamanolis, and Matthew Karau. 2004. RAW: Conveying Minimally-mediated Impressions of Everyday Life with an Audio-photographic Tool. In Proceedings of the SIGCHI Conference on Human Factors in Computing Systems (CHI '04). ACM, New York, NY, USA, 495-502. DOI: http://dx.doi.org/10.1145/985692.985755.

Robin N. Brewer, Leah Findlater, Joseph 'Jofish' Kaye, Walter Lasecki, Cosmin Munteanu, and Astrid Weber. 2018. Accessible Voice Interfaces. In Companion of the 2018 ACM Conference on Computer Supported Cooperative Work and Social Computing (CSCW '18). ACM, New York, NY, USA, 441-446. DOI: http://dx.doi.org/10.1145/3272973.3273006.

Ruy Cervantes and Nithya Sambasivan. 2008. VoiceList: User-driven Telephone-based Audio Content. In Proceedings of the 10th International Conference on Human Computer Interaction with Mobile Devices and Services (MobileHCI '08). ACM, New York, NY, USA, 499-500. DOI: http://dx.doi.org/10.1145/1409240.1409328.

David Frohlich and Ella Tallyn. 1999. Audiophotography: Practice and Prospects. In CHI '99 Extended Abstracts on Human Factors in Computing Systems (CHI EA '99). ACM, New York, NY, USA, 296-297. DOI: http://dx.doi.org/10.1145/632716.632897.

Xuedong Huang, James Baker, and Raj Reddy. 2014. A Historical Perspective of Speech Recognition. Commun. ACM 57, 1 (Jan. 2014), 94-103. DOI: http://dx.doi.org/10.1145/2500887.

Scott R. Klemmer, Jamey Graham, Gregory J. Wolff, and James A. Landay. 2003. Books with Voices: Paper Transcripts as a Physical Interface to Oral Histories. In Proceedings of the SIGCHI Conference on Human Factors in Computing Systems (CHI '03). ACM, New York, NY, USA, 89-96. DOI: http://dx.doi.org/10.1145/642611.642628.

Gilad Mishne, David Carmel, Ron Hoory, Alexey Roytman, and Aya Soffer. 2005. Automatic Analysis of Call-center Conversations. In Proceedings of the 14th ACM International Conference on Information and Knowledge Management (CIKM '05). ACM, New York, NY, USA, 453-459. DOI: http://dx.doi.org/10.1145/1099554.1099684.

Cosmin Munteanu and Gerald Penn. 2017. Speech-based Interaction: Myths, Challenges, and Opportunities. In Proceedings of the 2017 CHI Conference Extended Abstracts on Human Factors in Computing Systems (CHI EA '17). ACM, New York, NY, USA, 1196-1199. DOI: http://dx.doi.org/10.1145/3027063.3027117.

Neil Patel, Sheetal Agarwal, Nitendra Rajput, Amit Nanavati, Paresh Dave, and Tapan S. Parikh. 2009. A Comparative Study of Speech and Dialed Input Voice Interfaces in Rural India. In Proceedings of the SIGCHI Conference on Human Factors in Computing Systems (CHI '09). ACM, New York, NY, USA, 51-54. DOI: http://dx.doi.org/10.1145/1518701.1518709.

Neil Patel, Deepti Chittamuru, Anupam Jain, Paresh Dave, and Tapan S. Parikh. 2010. Avaaj Otalo: A Field Study of an Interactive Voice Forum for Small Farmers in Rural India. In Proceedings of the SIGCHI Conference on Human Factors in Computing Systems (CHI '10). ACM, New York, NY, USA, 733-742. DOI: http://dx.doi.org/10.1145/1753326.1753434.

Jennifer Pearson, Simon Robinson, and Matt Jones. 2015. PaperChains: Dynamic Sketch+Voice Annotations. In Proceedings of the 18th ACM Conference on Computer Supported Cooperative Work & Social Computing (CSCW '15). ACM, New York, NY, USA, 383-392. DOI: http://dx.doi.org/10.1145/2675133.2675138.

Madeline Plauché and Udhyakumar Nallasamy. 2007. Speech Interfaces for Equitable Access to Information Technology. Inf. Technol. Int. Dev. 4, 1 (Oct. 2007), 69-86. DOI: http://dx.doi.org/10.1162/itid.2007.4.1.69.

Anand Rajaraman and Jeffrey David Ullman. 2011. Mining of Massive Datasets. Cambridge University Press, New York, NY, USA.

Lisa J. Stifelman, Barry Arons, Chris Schmandt, and Eric A. Hulteen. 1993. VoiceNotes: A Speech Interface for a Hand-held Voice Notetaker. In Proceedings of the Interact '93 and CHI '93 Conference on Human Factors in Computing Systems (CHI '93). ACM, New York, NY, USA, 179-186. DOI: http://dx.doi.org/10.1145/169059.169150.

Altman, N. S. 1992. An Introduction to Kernel and Nearest-Neighbor Nonparametric Regression. The American Statis-tician 46(3): 175-185. ISSN 00031305. URL http://www.jstor.org/stable/2685209.

Anantha, R.; Chappidi, S.; and Dawoodi, A. W. 2020. Learn-ing to Rank Intents in Voice Assistants. URL https://arxiv.org/pdf/2005.00119.pdf.

Capes, T.; Coles, P.; Conkie, A.; Golipour, L.; Hadjitarkhani, A.; Hu, Q.; Huddleston, N.; Hunt, M.; Li, J.; Neeracher, M.; Prahallad, K.; Raitio, T.; Rasipuram, R.; Townsend, G.; Williamson, B.; Winarsky, D.; Wu, Z.; and Zhang, H. 2017. Siri On-Device Deep Learning-Guided Unit Selec-tion Text-to-Speech System. In Proc. Interspeech 2017, 4011-4015. doi:10.21437/Interspeech.2017-1798. URL http://dx.doi.org/10.21437/Interspeech.2017-1798.

Chen, X. C.; Sagar, A.; Kao, J. T.; Li, T. Y.; Klein, C.; Pul-man, S.; Garg, A.; and Williams, J. D. 2019. Active Learning for Domain Classification in a Commercial Spoken Personal Assistant. URL https://arxiv.org/pdf/1908.11404.pdf.

Gysel, C. V.; Tsagkias, M.; Pusateri, E.; and Oparin, I. 2020. Predicting Entity Popularity to Improve Spoken En-tity Recognition by Virtual Assistants. URL https://arxiv.org/pdf/2005.12816.pdf.

Lipton, Z. C. 2015. A Critical Review of Recurrent Neural Networks for Sequence Learning. CoRR abs/1506.00019. URL http://arxiv.org/abs/1506.00019.

McAllaster, G. M. K. A.-H. 2019. Bandwidth Embed-dings for Mixed-Bandwidth Speech Recognition. URL https://arxiv.org/pdf/1909.02667.pdf.

Rajaraman, A.; and Ullman, J. D. 2011. ing, 1-17. Cambridge University Press. CBO9781139058452.002. Data Min—doi:10.1017/.

* cited by examiner

Search Interface
1600

Action Interface for Page Interface
2100

Page Interface with comments
2200

Action Interface for Page Interface
3000

Setting Interface
3100

VOICE-BASED SOCIAL NETWORK

CROSS REFERENCE TO RELATED APPLICATIONS

This application claims benefit of priority from PCT/US2020/026771, filed Apr. 4, 2020, entitled "VOICE-BASED SOCIAL NETWORK", which further claims priority from U.S. Provisional Patent Application No. 62/830,370, filed Apr. 5, 2019, entitled "VOICE-BASED SOCIAL NETWORK", which is incorporated herein by reference.

FIELD OF THE INVENTION

Social Networks, Voice-Based Social Networks, Human-Computer Interaction, Artificial Intelligence, and Sensor and Audio.

BACKGROUND OF THE INVENTION

Social-networks are useful tools for everyday life. We can connect with friends and family, read and share information such as news, pictures, stories, opinions, etc. These systems have made so much impact on our lives, that we cannot live without them. Our related art is in the domain of the voice or audio based social-networking apps.

Some of the related voice-based prior arts are described in next paragraphs. These social-network apps or services such as Pundit, allow users to share their voice. Some apps like Koo! allows users to share short-form podcasts. Existing social network services such as Facebook have experimented with micro podcasting using a voice clip for status update. Most voice-based social-network apps and services exist in the domain of podcasting such as Apple Podcasts, Google Podcasts, Spotify, Breaker, Overcast, etc.

Bubbly, which is another related prior-art, is a social voice service working across feature phones and smartphones. For feature phones, users can record their voice by dialing a short code and speaking, as well as listen to popular posts. Subscribers get a text with the short code number for dialing into Bubbly's servers to have the voice message playback.

HearMeOut is another example of audio-based social networking service for sharing and recording around 42-second voice clips or mini podcasts to a user's feed. A new mobile app called "TuneIn OpenMic" has appeared on the iTunes App Store, offering users the ability to record and broadcast their "stories, jokes, reviews and more" and then share them with their friends. Apps such as OpenMic competes with a number of other voice-based social apps, like Spreaker, Dubbler, Bubbly, Talkbits, and others. To some extent, you could count several mobile messaging apps such as Voxer, Whatsapp or even Facebook Messenger, as voice recording is a common feature in those applications.

This invention is also related to traditional social-networks such as Twitter, Facebook, etc. Recently Twitter has launched voice-based live streaming on Periscope App.

One problem with all existing services is they are either in the non-audio domain or fully audio domain. For instance, on Twitter you can see a Tweet (a 140-character post on twitter is called Tweet), but you cannot listen to a Tweet in the user's voice speaking exactly the same or dictated words. If we consider only audio-based social networks, their post includes an audio clip, but title or description does not necessarily match with the user's voice.

Another problem with existing social networks is they lack smart interactive sharing. A simple sharing of a post involves many steps, such as what should be the title of the post, what should be hashtag, what is an appropriate picture, etc. Existing social networks are not fully smart using new Artificial Intelligence techniques. For example, if you want to share a post on Twitter, you need to type a hashtag. On Facebook, if you want to share a post without a picture, the system should be able to guess the picture for the given post.

Some non-social-networking applications such as Apple's Clip app allows users to create a video with live sub-titles. These subtitles can be generated manually or by an automated speech-to-text recognition algorithm. Real-time speech recognition systems can be used for automating call-center analysis and monitoring. These systems integrate transcription of incoming calls for the analysis of their content. Researchers have experimented with voice augmentation with physical objects such as paper, books, etc. Project VoiceList, a telephone-based user-generated audio classifieds service, provides an infrastructure for a user-driven community service where there is minimal connectivity to the Internet. Some prior work such as Audio-books Spoken work recording or audio books interfaces allow users to listen to text recording of a book.

Some existing voice-based interfaces such as Google Assistant, Alexa and Apple Siri interface can be used to provide accessibility. One another interesting prior art is VoiSTV: a voice-enabled social TV, which fetches information from twitter in real-time related to TV programs. Prior art such as Audiophotography explores the labeling of sounds-of-the-moment with photos. Some systems such as Voice Memos Interfaces allow users to record their voice. For example, VoiceNotes application allows the creation, management, and retrieval of user-authored voice notes containing thoughts, ideas, reminders, or things to do.

SUMMARY OF THE INVENTION

To solve these problems, this invention presents a novel voice-based social network, where users can compose, explore, and share voice posts. First of all, instead of just typing a post, the proposed novel system exploits Speech-To-Text technology to extract (transcribe) text from the user's speech. Each voice post is composed of audio, text with dictation (transcribed text), and other optional elements such as picture or video clip. During the composition step, the user speaks to the microphone, and generates text using the text-to-speech method.

Using interactive techniques, users can correct any Speech-To-Text errors. During this process, the system collects two pieces of information, first text from the speech and second user's voice or audio data. Using information available in text, the system automatically inferences tags or categories.

After sharing, the voice post is visualized with dictated (transcribed) text to provide an interactive user experience. Each voice post is visualized as a text on the top of a picture or video clip in the form of overlay. Text is highlighted with a synced audio part-of the speech.

Users optionally choose other post elements such as picture, video, etc. In some embodiment the system also inferences a cover picture using given text, tag, and voice. This is a very simple and fastest way to share a post. Now all posts contain voice with the matched dictated text using Speech-To-Text technology.

Because errors in the Speech-To-Text process are corrected using Input Text Interface, users can listen and read the correct post title for the voice post. Users can explore voice posts using Search Interface using keywords and categories. Users can also comment using voice posts.

This system also provides advanced interfaces such as Recommendation Interface where users can see related posts, Connection Interface where users can connect each other, Message Interface where users can communicate with each other.

This is a very useful invention which presents improvements over existing systems. System can be used for many applications to discover and share photographs, microblogs, music, news, opinions, activities, events, advertisement, jobs, weather, etc.

We believe that voice is the most powerful medium for sharing information. Even if you don't know how to read and write, you can actually communicate through your voice.

With recent advancement in deep-learning and artificial intelligence, we have better human-level speech recognition technologies and tools than a few years ago. Proposed system exploits this advancement and presents a unique social-network for voice where you just have to speak and the app generates short voice posts with dictated (transcribed) text.

In summary, existing social-networking services are based on traditional ways of sharing information. For example, you can type a tweet, and view it, but you cannot listen to it unless it is manually posted as a video. The proposed system is a new way to share information using voice posts and voice comments. Unlike existing social-networks each post also contains an audio with related directed text. This mechanism also makes sharing very simple and easy. Post also contains automatically generated tags. The User Interface is so simple that any 4-year-old boy can use it. Because it's voice-based, any illiterate user (for example an Indian farmer) can share a voice post just speaking in Hindi language.

BRIEF DESCRIPTION OF THE DRAWINGS

FIG. 25 shows Add Post Interface before post submission with selected Cover Picture, Title, Voice, Suggested Category or Tag and an option to add more fields using the "+" button.

DETAILED DESCRIPTION OF THE INVENTION

This invention presents a novel voice-based social network in terms of architecture, design and user interfaces. This invention proposes a simple way to connect people irrespective of nationality, race, conditions, languages, and literacy using novel human-computer interaction techniques.

System Architecture

Figure 1:
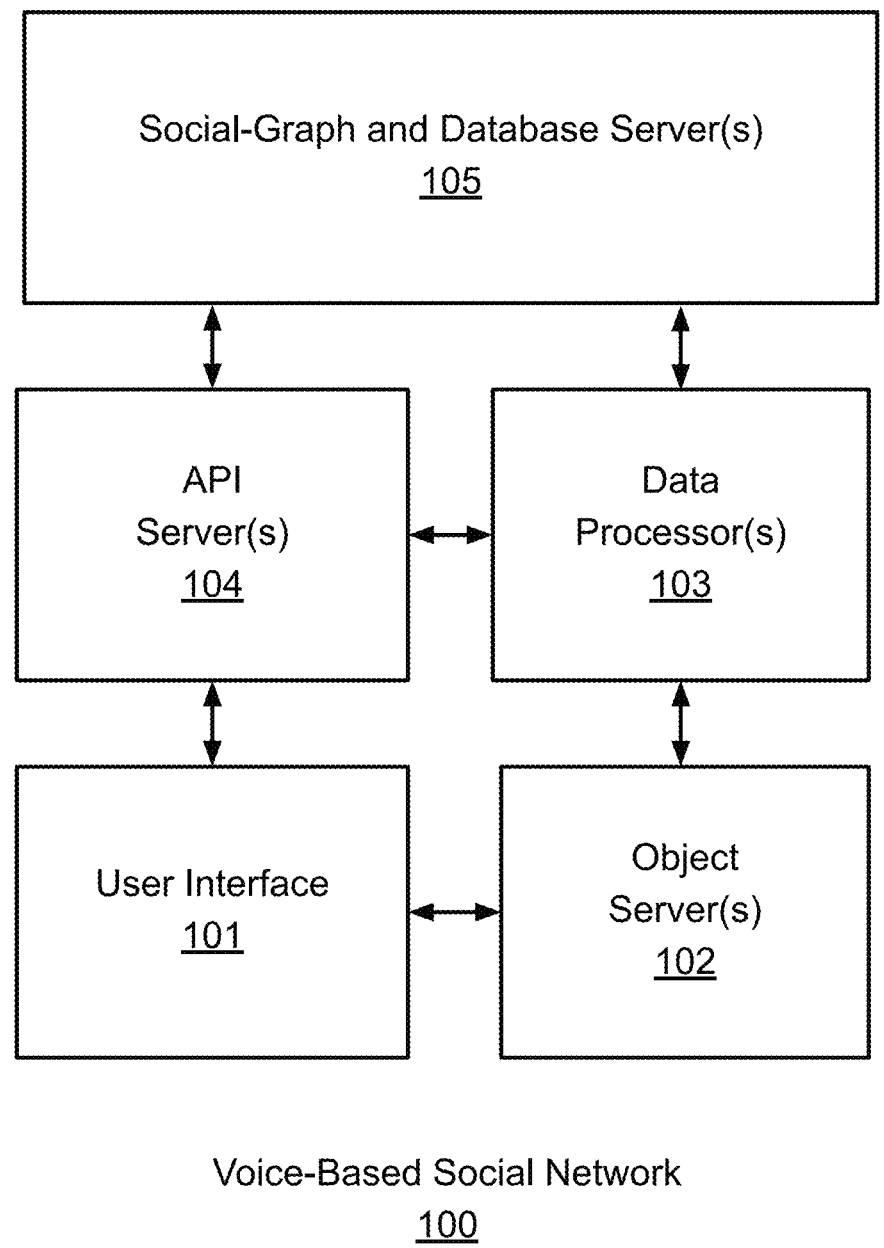
FIG. 1 is a block diagram of a voice-based social network system.

FIG. 1 shows basic building blocks of proposed voice-based social network systems. User interface 101 running on a computing device (client device) fetches data from Social-Graph and database server 105 via Application Programming Interface (API) 104 over the internet. User interface fetches objects such as images, voice, files, etc. from Object server 102. Data collected by database Server 105 is processed by data Processor 103.

Social Graph and Database server stores user post, account information, messages, and other required information. Object Server 102, contains one or more Voice server, Image Server, Video Server, File Server, and Any other object such as HTML, JSON object. These objects are saved into Object Server with a unique key. Data processor contains various types of processing units or modules (server) such as Inference Module for inferencing various missing information in data, Sustainability Module, Keyboard generation, Spam Detection, and additional required Module such as Image, Video processing Module, etc.

One of the coolest features in this invention is inferencing missing information. For example, a system can infer tag or category, text from speech, image objects, language, user mode, location, network, and page layout for a given post. Inferencing missing information is a challenging task. However, we can use various existing Machine Learning, Information Retrieval, Data-Mining, Natural Language Processing algorithms for various heuristics.

Let's take an example of an inferencing category of objects also known as "Classification". Classification can be done using supervised and unsupervised learning-based methods. Consider a vector based supervised learning-based method in which we have a set of training data for each object class. Each object is a collection of sets of attributes and their values.

To keep it simple, let's only consider the description attribute and its value as text (String type). First, pre-processing is (removing stop-words, spam, lower-case conversion, etc.) performed on the training set and each training object is converted into a vector. Each vector represents a list of words or features with their weight in the text. For example, weight can be initialized with 0-1, Term Frequency (TF), or TF * IDF (Inverse Document Frequency). Query object (object without a category), is compared with the centroid vector of training data $\vec{T_c}$ for class C and ranked using vector-based similarity scores such as cosine, etc. Using highest score α, we can inference the category as shown by following equation:

$$\alpha = sim(\vec{O}, \vec{T_c}) = \cos(\theta) = \frac{\vec{O} \cdot \vec{T_c}}{\|\vec{O}\| \cdot \|\vec{T_c}\|}$$

In some embodiments, Vector representation also includes Object attributes and the value for better results. For example, vector for a training object might have tag attribute with value "#goodmorning". In some embodiment, given a set of training data for each class, we can use naïve Naive Bayes Classifiers for classification. For example, probability of object O being in Class C as follows:

$$\alpha = P(C_k \mid O) = P(C_k) \prod_{i=1}^{n} P(w_i \mid C_k)$$

In the above equation, P(C) is the prior probability of C, $P(w_i|C)$ is the conditional probability of term or word $w_i$ in Object. Class label $\hat{y}=C_k$ for some K can be computed using Maximum a Posteriori (MAP) as follow:

$$\hat{y} = \underset{k \in \{1, \ldots K\}}{\operatorname{argmax}} P(C_k) \prod_{i=1}^{n} P(w_i \mid C_k)$$

In some embodiment, we can apply other available state of the art techniques such as Expectation maximization (EM), Neural networks, Latent semantic indexing, Support vector machines (SVM), Artificial neural network, K-nearest neighbor algorithms, Decision trees, Concept Mining, Rough set-based classifier, Soft set-based classifier, Multiple-instance learning, Topic Modeling, and other existing Natural language processing approaches. Various open-source SDK, libraries and tools can be used for classification.

In some embodiments, categories and tags are represented together in the tree hierarchy. For example, "/news/world" where "/news" is a category and "/word" is a tag. Tags are kinds of subcategories and they are generated using NLP based Keyword Extraction Algorithm from https://www.nltk.org.

In some embodiments, Automatic taxonomy construction methods are used for both classification and keyword generation. For example, we can use K-mean clustering and Topic Modeling algorithms for category generation.

Users can access voice-based social networks using user interfaces running on Devices such as Tablet, Computer, Laptop, Wearable, Head-Mounted Display, etc. using API 108. Client Device or Computing device may contain any additional hardware or software component required to execute this invention.

Navigation Design

User Interface is an important part of a voice-based social network. It provides an interface between user and voice-based social network systems. Proposed voice-based social network provides a simple and usable interface. Everything starts with a welcome screen or login screen. New user creates a new account, and verifies using work or personal email address.

Figure 36:
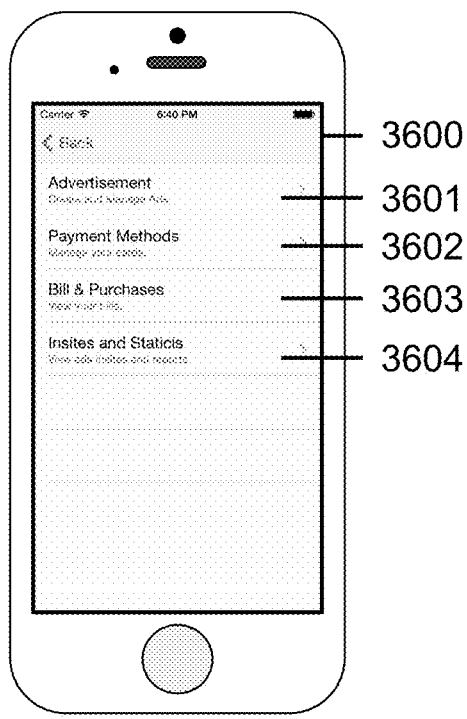
FIG. 36 shows an example of Advertisement Interface.
Figure 37:
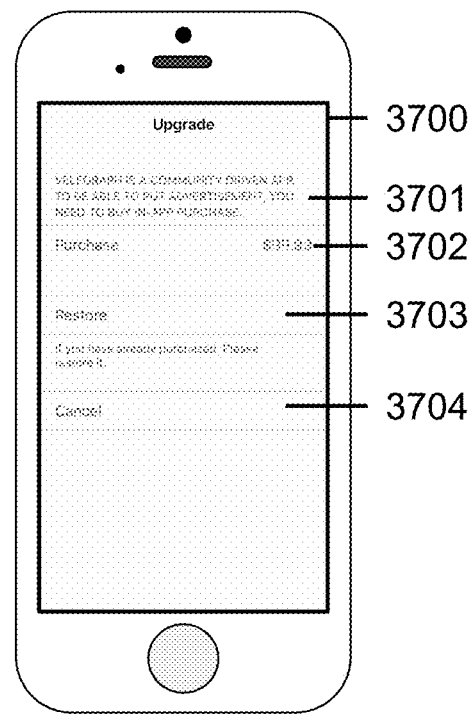
FIG. 37 shows an example of Store or Payment Interface.
Figure 38:
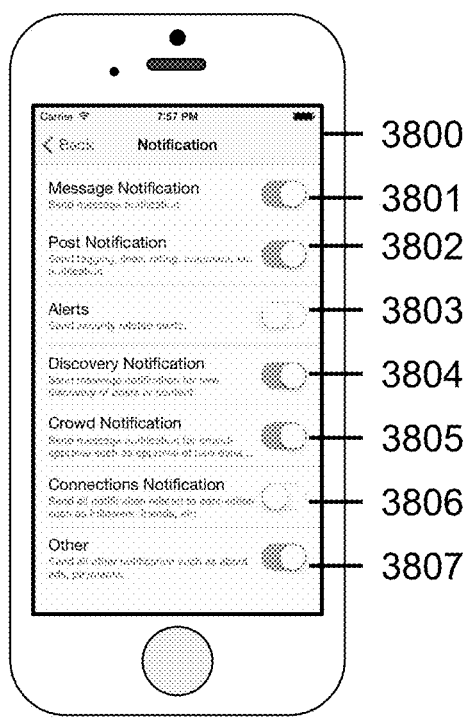
FIG. 38 shows Notification Interface with example permissions such as request for sending Push Notifications.
Figure 39:
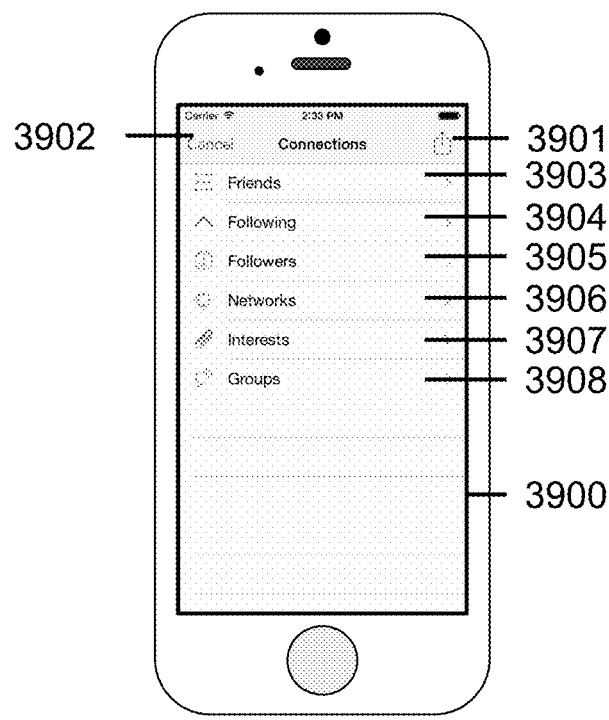
FIG. 39 shows Connection Interface.

After signup user navigates to Home Interfaces which contains various tabs or menu for Recent Tab Item 1104, Explore (or Search) Tab Item 1105, Profile Tab Item 1106, Message 1107 and Other Interfaces as Setting Interface (FIG. 3100), Connection Interface (FIG. 39), Report Interface, Statistics Interface (FIG. 33), Form Interface, Advertisement Interface (FIG. 36), Notification Interface (FIG. 38), Advance Setting Interface, Store and Payment Interface (FIG. 37), and Favorite Interface. In some embodiments, the last Tab Item can be labeled as "More" to provide navigation to remaining Interfaces.

Figure 11:
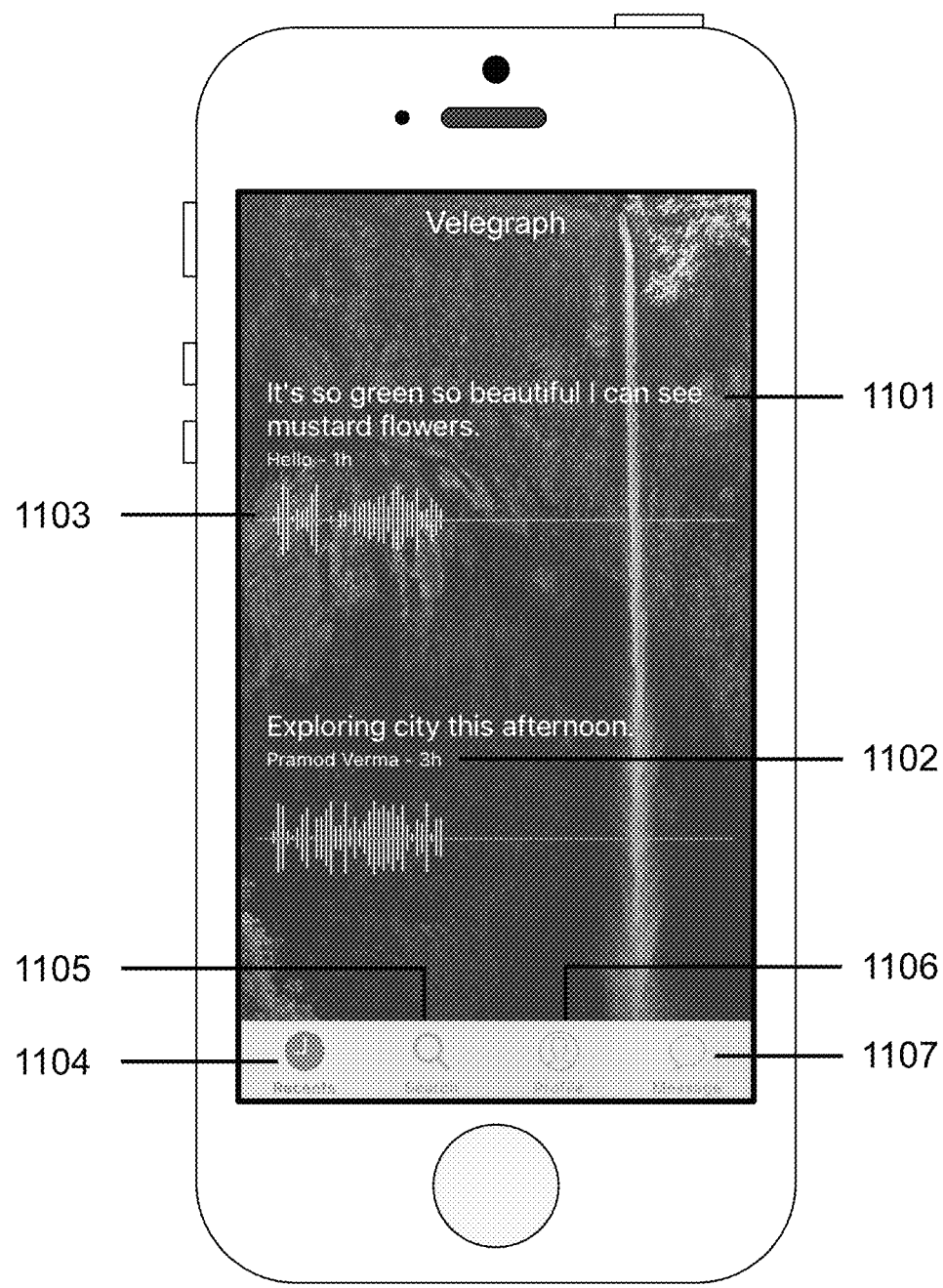
FIG. 11 shows Recent Interface with image background.

In a preferred embodiment, the home menu contains navigation to all main such as Recent, Explore, Profile, Messages, etc. as shown in FIG. 11. Similarly, in another embodiment, profile menu may contain user info and navigation to other remaining Interfaces. In some embodiments, the menu icon can navigate to the main/home menu. In some embodiments, "More" button is provided on Tab or Menu for additional interfaces.

Figure 12:
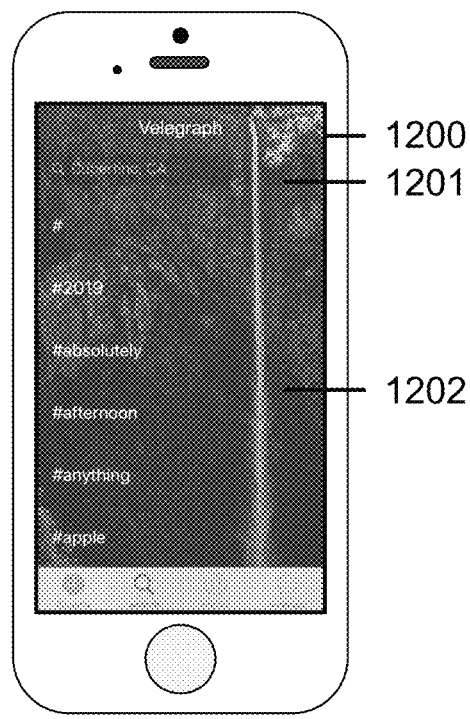
FIG. 12 shows Recent Interface with image background.
Figure 22:
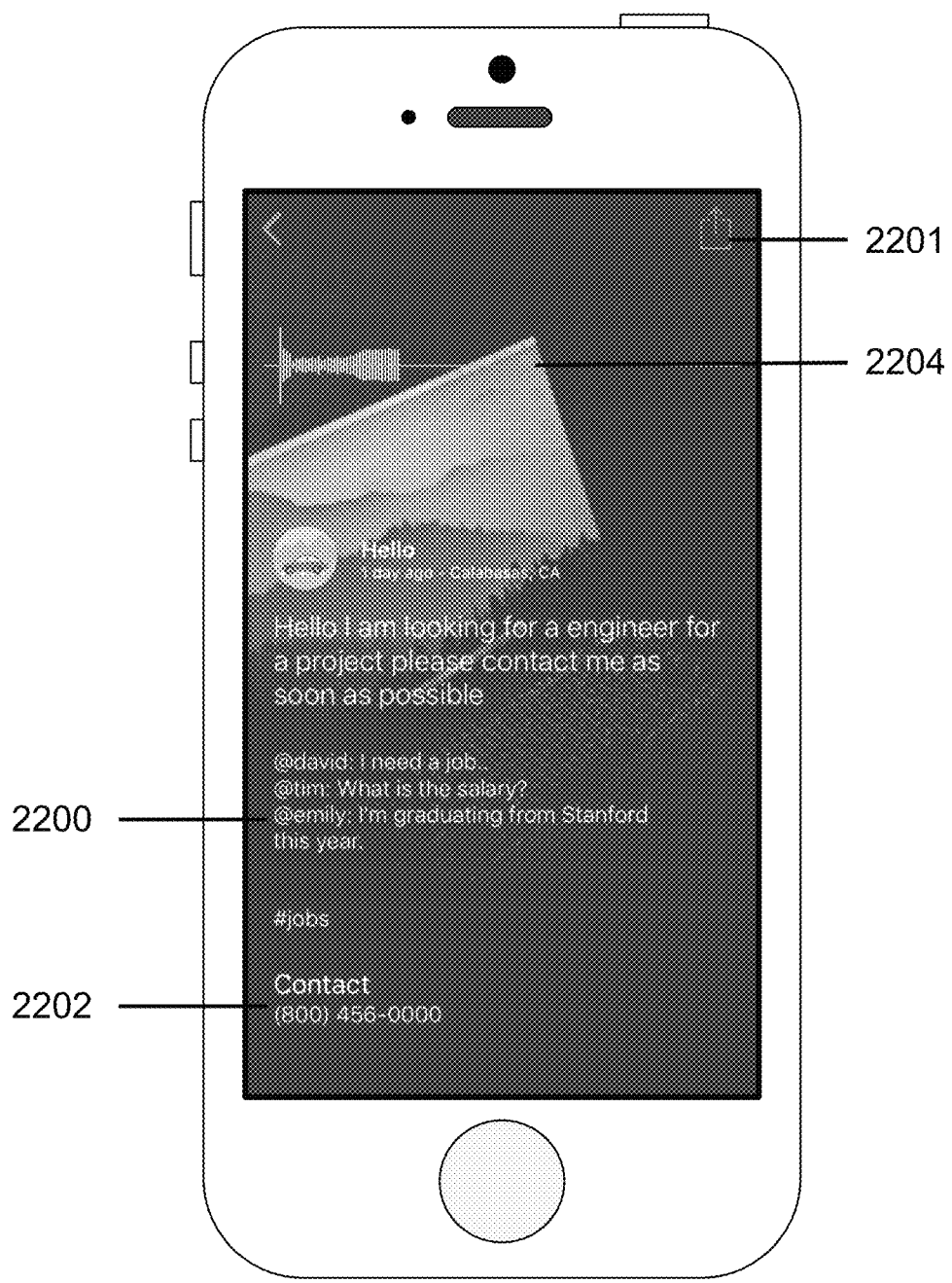
FIG. 22 shows Page Interface visualizing a voice post.

On Explore Interface as shown in FIG. 12, users can perform query operation using keyword, category or tags. System can use various types of Query Interface such as Instant Search Interface (FIG. 14), Voice Interface, Sketch Interface, Brain-Computer Interface (For research Applications), Image Query Interface and other state of the art Query Interface. For each query, the system displays search results, which can be filtered, sorted, and viewed in many forms. such as Maps, Images, Lists, Thumbnails. etc. Each extracted object is rendered on Page Interface 2200 as shown in FIG. 22. For each page user sees some suggested recommendation posts using swipe interaction on mobile user interface. On web based these recommendations can be displayed as links or thumbnails.

Figure 15:
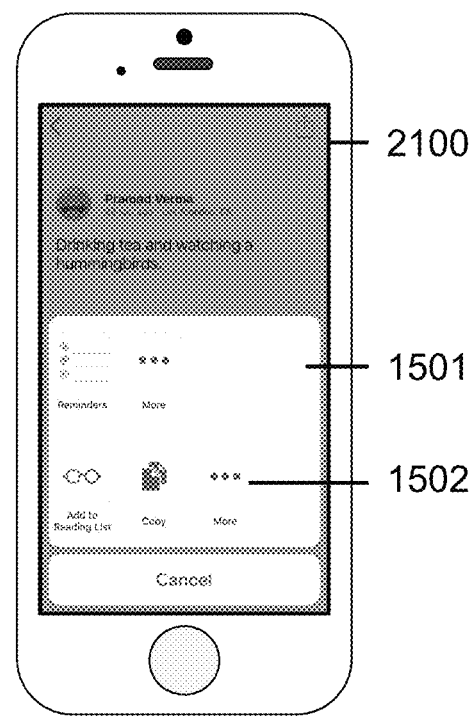
FIG. 15 shows implementation of More Action Interface for Page Interface.
Figure 21:
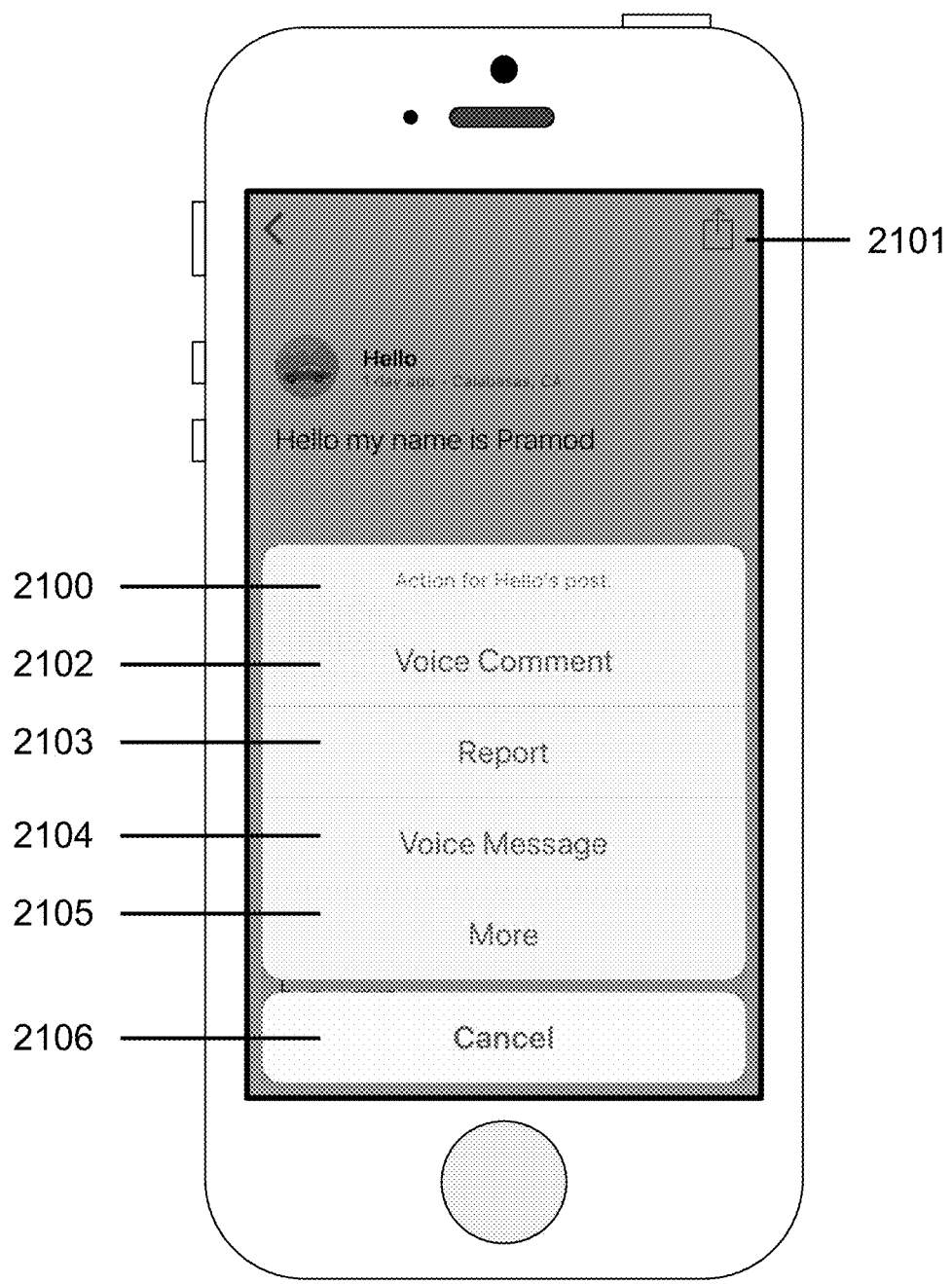
FIG. 21 shows implementation of Action Interface for Page Interface.

Users can perform actions on each Page Interface as shown in FIGS. 21 and 15. List of examples of page actions and their navigation are Edit Interface, Compose Message Interface, Share Interface, Delete Interface, Submit Form Interface, Widget Interface, Save Interface, Augmented Reality Interface, Comment Interface, Lice Chat Interface, Rate Interface, Flag Interface, View Statistics Interface, Replay Video or Audio Action and other actions such as Print.

Figure 29:
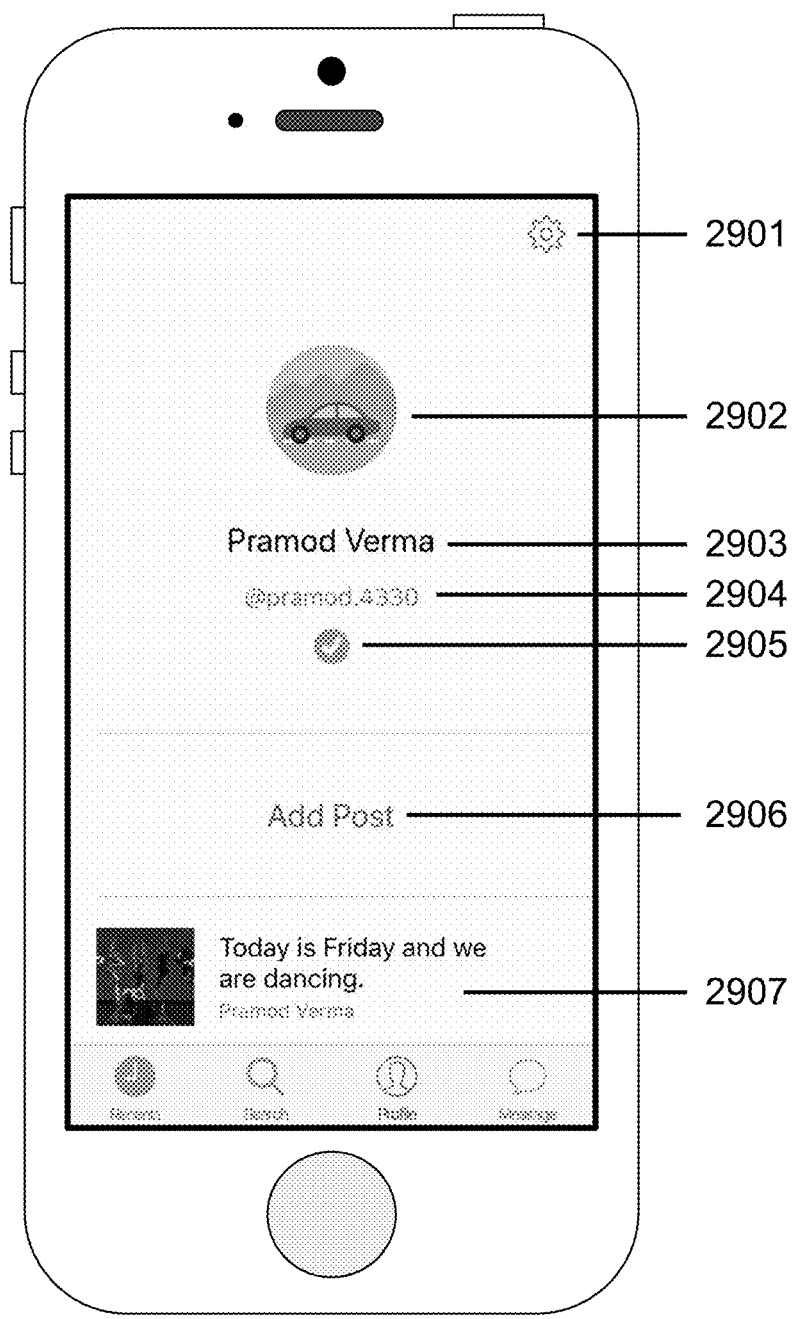
FIG. 29 shows Profile Interface with verification information with checkmark.

Profile Interface can be accessed via Profile Tab from home interface as shown in FIG. 29. Main function of Profile Interface is to provide a utility to users to add posts in search index. Add Post Interface can be accessed via Add Post button. Users can add posts using basic inputs, advance input and widgets. Basic inputs are Voice Input, Cover Picture Input, Text or Description Input and Tag or Category Input. Voice Input is further navigating to Speech-To-text Input (like Siri in iOS devices) as shown in 17, for inferencing text from speech. We also store voice after dictation to augment voice posts on Page Interface.

Some example of optional or advance Input Interfaces are Large Text Interface for HTML; Visual Interface for Video Interface, GIF, Animation, etc.; File Interface for .pdf, .doc, etc.; Data Interface for Date Interface, Number Interface, Time Input Interface, Date-time View Input Interface, Option Input Interface, Range Input Interface, etc.; 3D Input Interface for 3D Map, 3D Compose; Form Interface for Survey Form, Job Application Form, etc.; Map Interface for 3D Map Interface; Sensor Interface for Barcode Interface, Taste Interface, Haptic Interface, Drone Widget, Smell Interface, Medical Device Widget, etc.; Sketch Interface for 2D/3D Sketch or Drawing; URL; Contact; Widget for Booking Interface, Payment Widget, Checkout Widget, Live Widget, etc.;

Users can send voice-based messages to other users. Message Interface can be navigated from Home Interface or Tab Interface.

In some embodiment, system can crawl voice (audio) and video data using "Voice Bot" from various web services such as https://api.youtube.com for /video; https://api.music.apple.com for /music; https://api.cnn.com for /news; https://api.weather.com; /weather; https://api.video.twitter.com for /video; https://api.facebook.com for /social-video and https://api.<any-other-service>.com /<category>.

This crawled information and data can be used by other subs-systems such as web service, Object Server 102, Data Processor 103, API Server 104, and Social-Graph and Database Server 105. For instance, Voice Bot can be used to crawl recently released music with their lyrics, and provide a stream of voice posts in "#music" category.

Each information is classifieds as a category and tag such as /web, /web/health-insurance, /news, /news/Asia, /news/health, /events, /events/music, /events/drinking, /places, /places/dog-park; /places/beach, /jobs, /jobs/engineering; /jobs/nursing, /activity, /activity/surfing, /activity/walk, /apartment, /apartment/one-bedroom, photography, /photography/nature, /weather, /weather/earthquake, /metro, /metro/buses; /metro/rides, /dating, /dating/blonde; /shopping, /shopping/apparel, /food, /food/breakfast; /food/dinner, /poetry, /poetry/nature; /poetry/women, /person, /person/artist; /person/lawyer, /education, /education/courses, and /<other-category>/<tag>.

In some embodiments, we can only use a single tag or hashtag for classification. For instance, #obama. Some examples of various types of available views for Search Interface are List View Interface, Map View Interface, Thumbnail View Interface, Category View Interface, Image View Interface, Augmented Reality View Interface, Satellite View (Google Earth), Other View Interface such as user defined View.

User Interface

Figure 10:
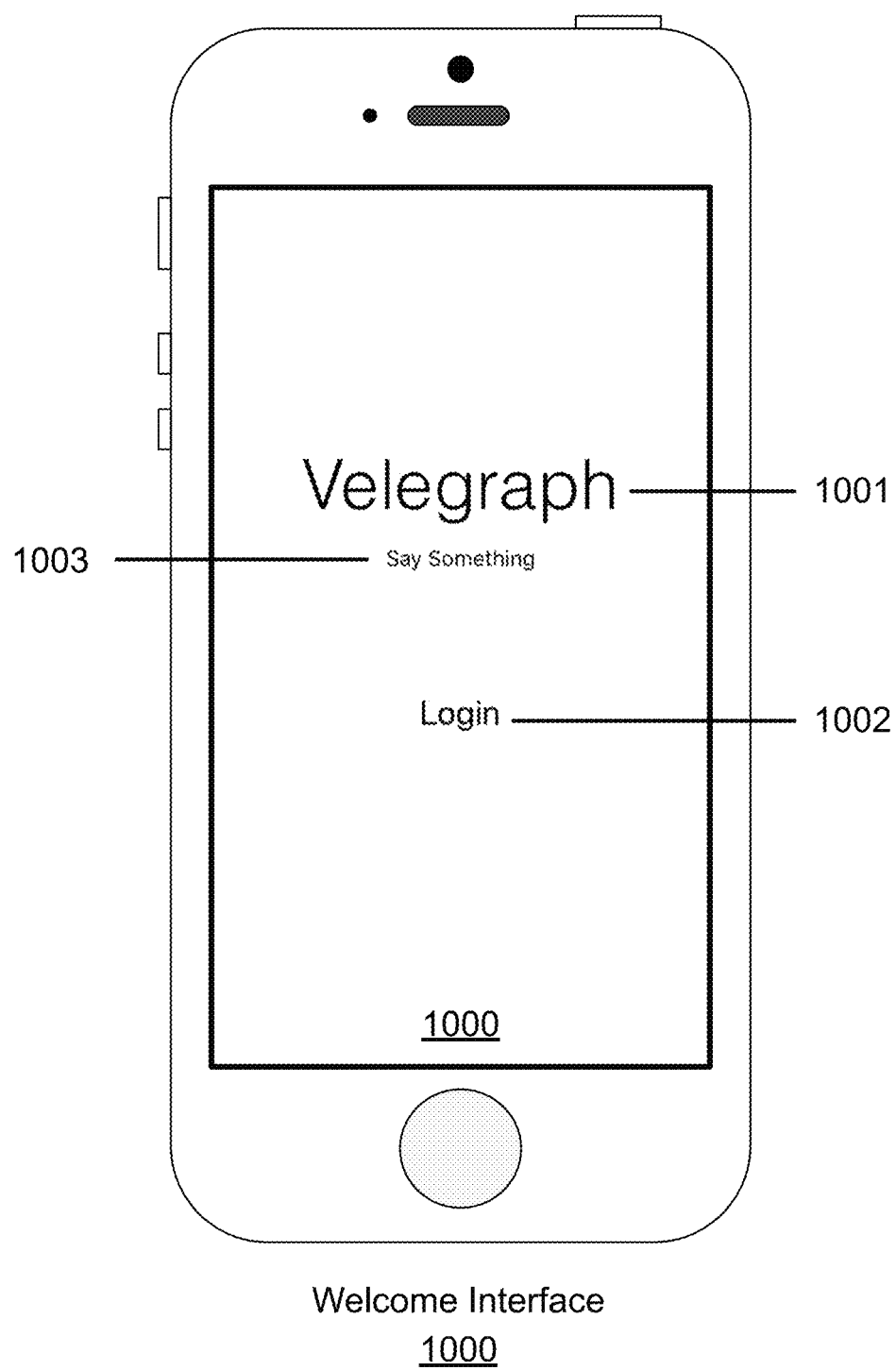
FIG. 10 shows Welcome Interface with logo and login button.

Welcome Interface 1000 contains color wallpaper, logo 1001, slogan or location 1003, and login button as shown in FIG. 10. After clicking or touching login button 1002, the user navigates to Login Interface, containing login information such as username, password, links to create new Account, and reset password. In some embodiments, users can choose the login option on the Action Sheet for Login Interface.

Figure 33:
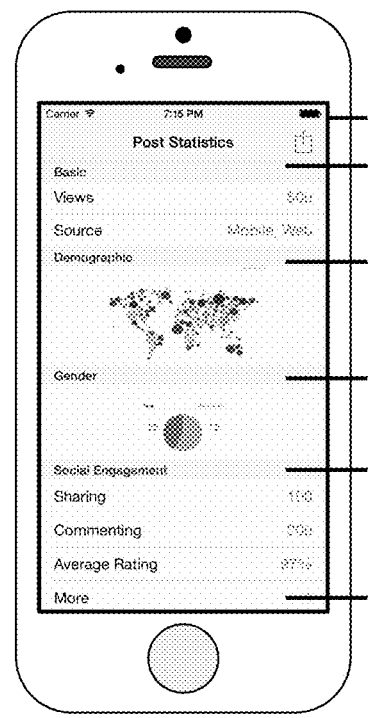
FIG. 33 shows Statistics Interface for a given voice post.

In some embodiments, User navigates to the Network Interface after clicking on the Create New Account link. Network Interface contains a list of Public and Private networks. On Signup Interface, users can create new accounts by providing information such as username, full name, password, and email. User joins by clicking the Join button. To reset the password, the user is navigated to the Reset Password Interface. Users can update account information in Setting Interface 3100 as shown in FIG. 33. Setting Interfaces also contains links to various other helpful or information such as Legal, Terms and Condition, Navigation to Logout, Delete account button, etc.

In some embodiments, the signup section can be omitted and users can visit the Home Interface using a "guest" account. Guest accounts can be created just using a full name. This feature allows visitors to explore the Recent, Explore Interface, and navigate to Sign up or Login Interface if required for some actions such as Messaging, etc.

Recent Interface

FIG. 11 shows Recent Interface 1100 containing recently added voice post 1101. Each post can be visualized using a picture icon or wave 1103 related to voice, title, username, posted-date-time, and location, and any other statistics such as number of comments or likes, etc.

Figure 13:
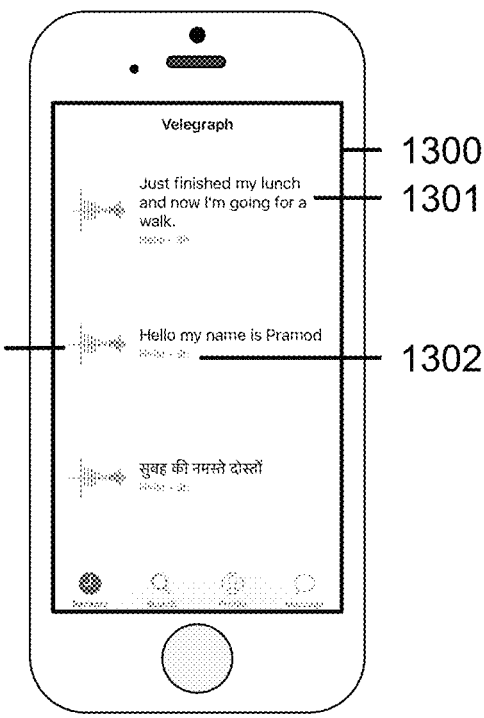
FIG. 13 shows Recent Interface displaying recently added posts.
Figure 16:
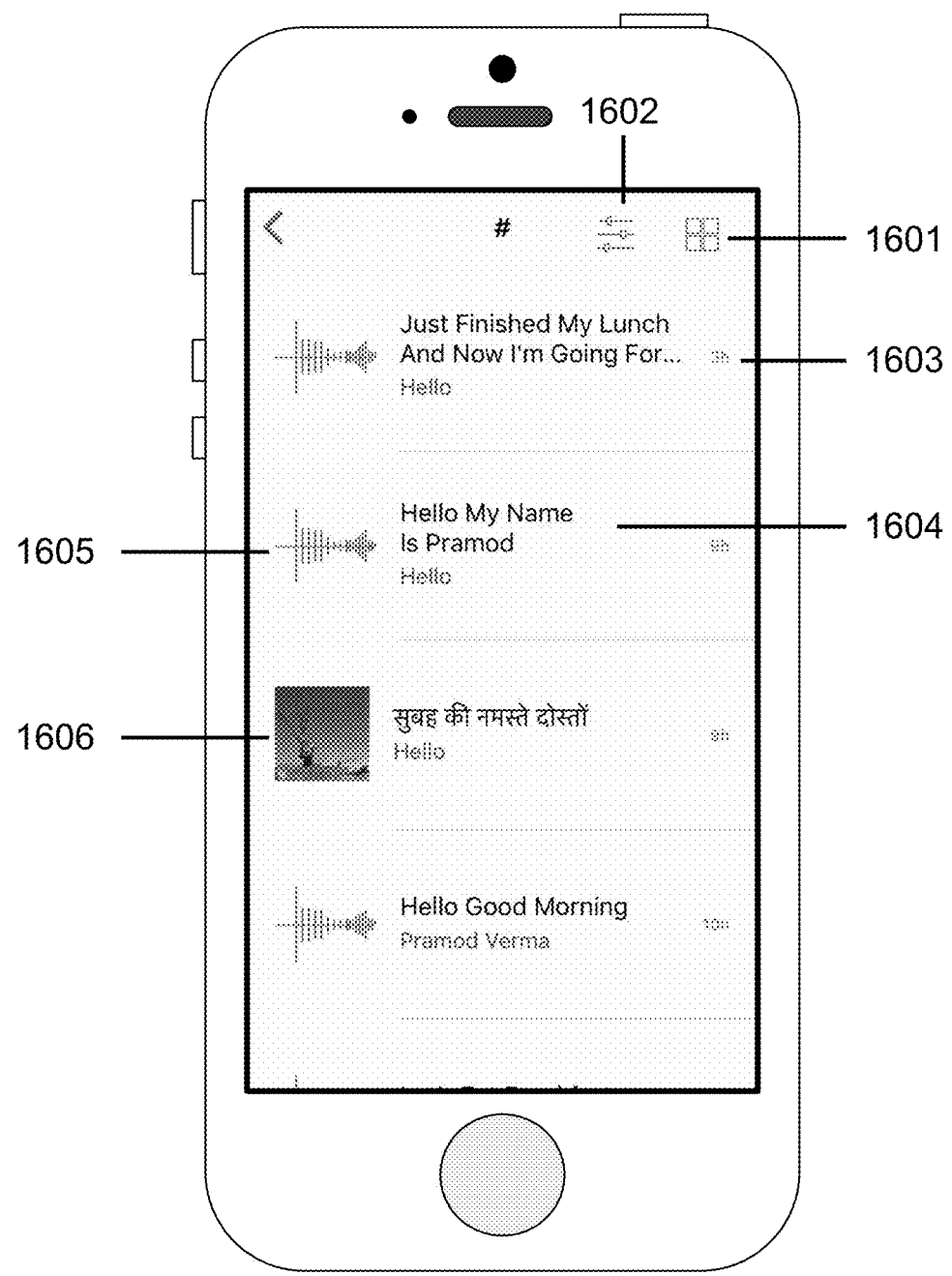
FIG. 16 shows Search Interface.

In some embodiments, Recent Interface 1100 may contain a background wallpaper as shown in FIG. 12. After clicking on a post item, the user navigates to search results on Search Interface 1600 as shown in FIG. 16. FIG. 13 shows another embodiment of Recent Interface Explore Interface FIG. 12 shows preferred embodiment of Explore Interface containing, logo, location or network, and various categories or tags 1203. The user can switch to another user interface using tab. After clicking on a category or query, the user navigates to search results on Search Interface 1600 as shown in FIG. 16. Users can filter results using link 1602 or change view using link 1601. Each search result contains one or more feed post 1603. For each search result item, the user is navigated to Page Interface 2200 as shown in FIG. 22. In some embodiments, Explore Interface may contain a background image. In some embodiment shows Explore Interface 1200 may contain wallpaper, logo, location or network, and various categories.

Figure 14:
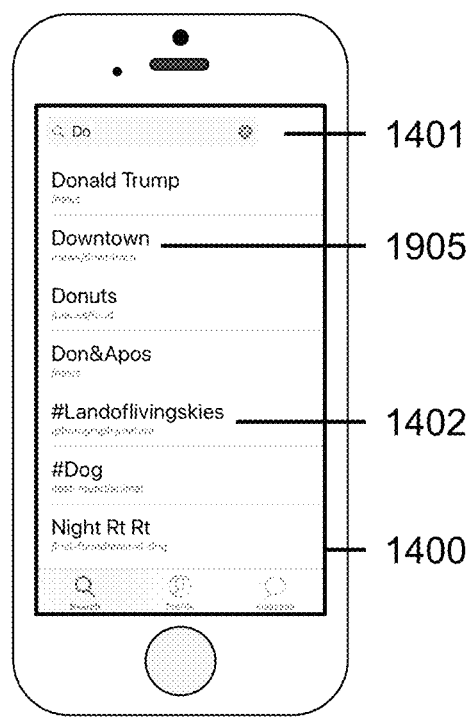
FIG. 14 shows Query Interface using Instant Search Interface.

Users can use various types of Query Interfaces such as Voice Interface for making query, and Instant Interface. Users can also use search bar 1401 and select matched keywords or categories 1402 for making a query using Instant Interface 1400 as shown in FIG. 14.

Figure 17:
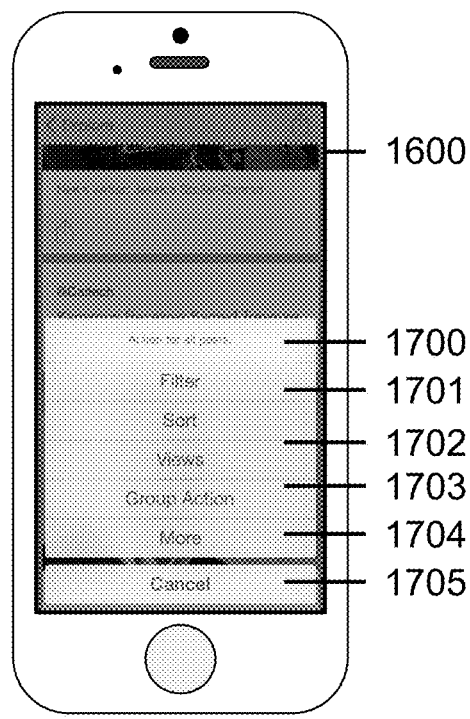
FIG. 17 shows Action Sheet for Search Interface.
Figure 18:
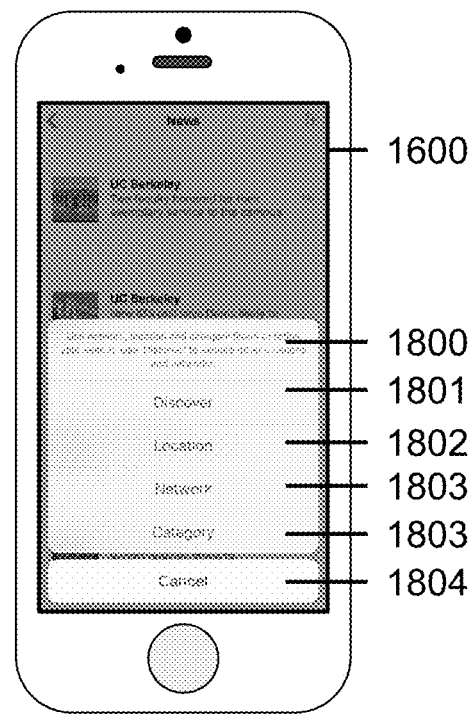
FIG. 18 shows another example of Filter Interface.
Figure 19:
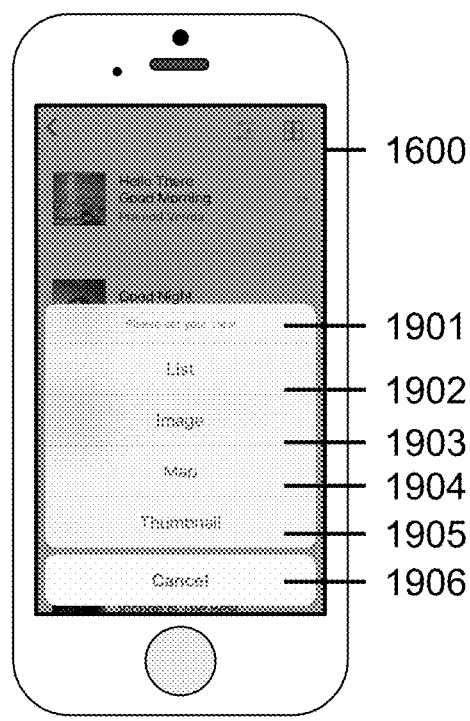
FIG. 19 shows another example of View Filter Interface.

After clicking on a post item, the user navigates to search results on Search Interface 1600 as shown in FIG. 16. Users can filter search results using action button 1602 and action sheet 1700 as shown in FIG. 17. In another implementation users can use the action button to invoke the action sheet to filter the results as shown in FIG. 18. Users can select various types of available views such as List, Feed, Images, Thumbnail, etc. for search result visualization using action sheet 1900 as shown in FIG. 19 using action button 1601 on Search Interface.

Figure 20:
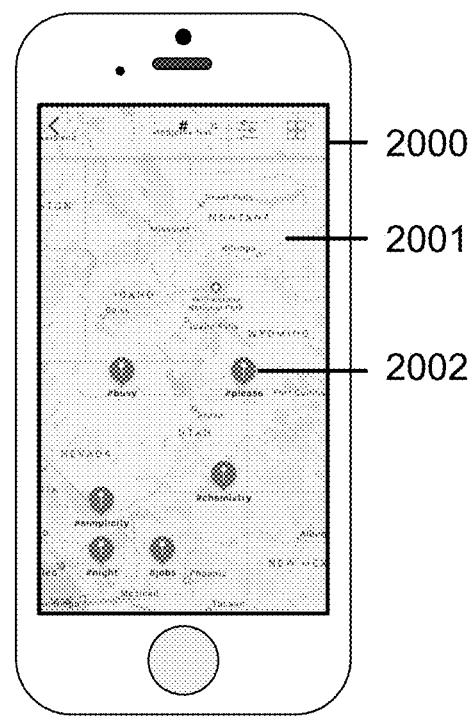
FIG. 20 shows Search Interface with map view.

In another example, on the map-based view where information and landmarks can be visualized on a map as shown in FIG. 20. Users can also mix results using action sheets from various types and categories to enrich the map-based visualization. Search Interface results can be displayed on Image View using image tiles. In some embodiments, results can be shown as categories for each post in Category based View.

Users can sort search results using various sort actions. In another novel feature of this invention, users can also perform various group actions such as multiple printing, or share, Play All Voices (Audio) or video, Apply for Jobs, etc. using Group Actions Interfaces. Some examples of filter interfaces are Location Filter, Visual Map based Location Filter, Category, Tag, and Keyword filter, date-time range filter, Color Filter, Voice/Video duration filter, Network Filter, and any other filters such as post attribute-based filter.

Page Interface

One of the unique features about this invention is visualization of text with highlighted part of the speech on Page User Interface as shown in FIG. 22. This creates a unique user experience for readers who want to read and listen to the post. Page Interface 2200 as shown in FIG. 22 contains action 2201, optional cover picture 2203, user information, and page details 2202 such as title, description, category, links etc.

Figure 34:
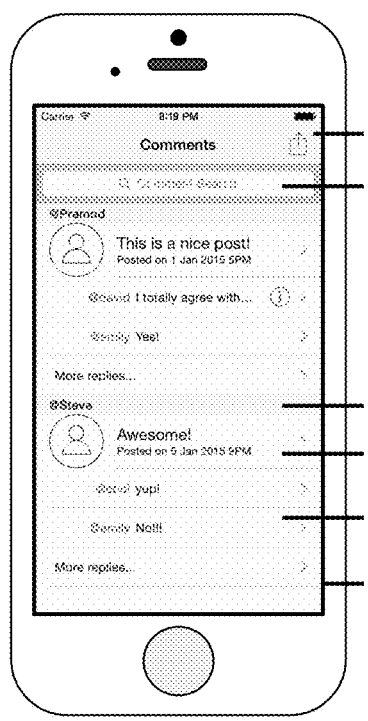
FIG. 34 shows Comment Interface for sharing and listening voice comments.
Figure 35:
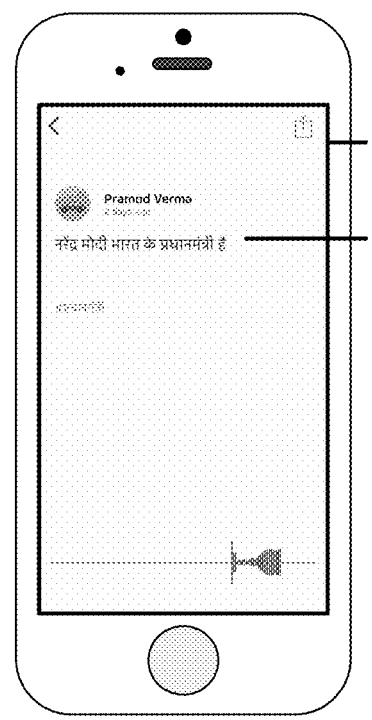
FIG. 35 shows Page Interface with voice post which can be shared in any language such as Indian language (Hindi).

Page interface also visualizes waves from voice/audio 2204 as shown in FIG. 22. Users can invoke various actions 2102-2106 such as Voice Comment, report, Voice Message, and More such as Share, Edit, Delete, Report, More and Cancel. using the action button or link on Page Interface 2200 as shown in FIG. 21. FIG. 22 also shows a voice post with voice comments. These comments are played after the main post. Example in the post shows a post about a job listing with contact number. In some embodiments, users can write comments and search comments using the search bar on Comment Interface as shown in FIG. 34. Users can view the full image by clicking or touching the cover image in Image View. In some embodiment, multiple pages can be linked.

Recommendation Interface

Figure 32:
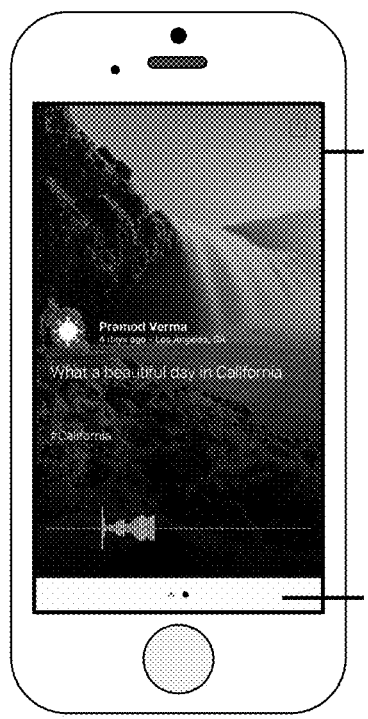
FIG. 32 shows Recommendation Interface.

For every post, the system tries to provide some recommendation using Recommendation Interfaces as shown in 32. For instance, In FIG. 32 shows recommended posts using dots 3200. Users can customize recommendations settings on Recommendation Setting Page. This is a very interesting feature, especially for search, where users can browse voice posts and easily swipe related recommended voice posts.

Another novel feature of this invention is region of interest (ROI) based Rating Interface for a given image in which users can select and rate area or ROI using a slider. Users can also rate posts using Rating Interface. To maintain quality of content, the system also provides users an option to flag or report problems in Report Interface. Statistics Interface contains various details about post statistics such as views, source, demographic, gender, sharing, commenting, rating, etc. Users can also access Statistics Interface for all posts from Home Interface.

Messaging Interface

Figure 40:
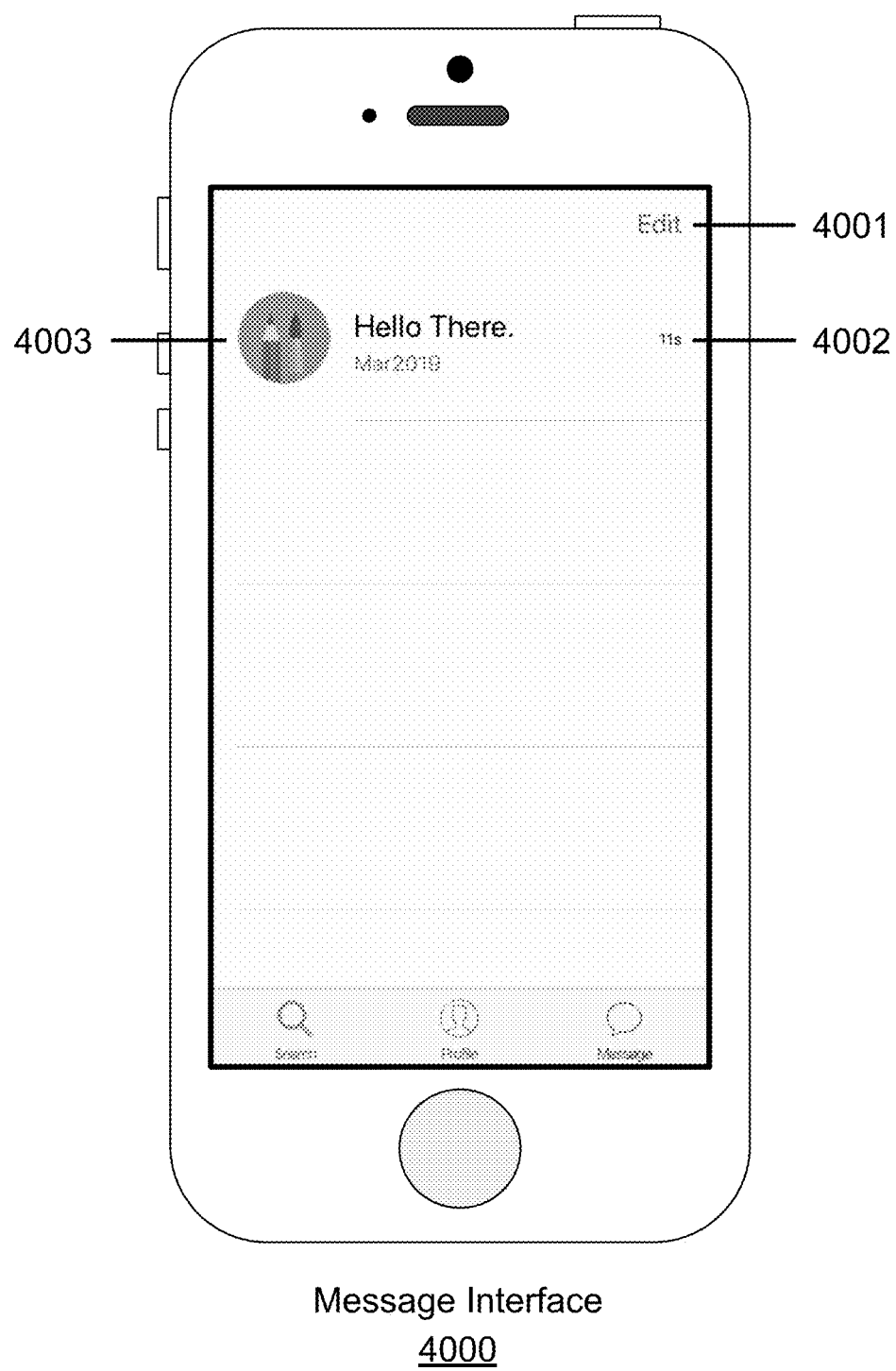
FIG. 40 shows Message Interface.

Using Messaging Interface users can send messages. Each message for example has some details such as message body, time-stamp. Users can also edit messages 4002 using edit button 4001 as shown in FIG. 40. Each message item is further navigated to Thread Interface which lists all related threads for a given conversation.

Figure 23:
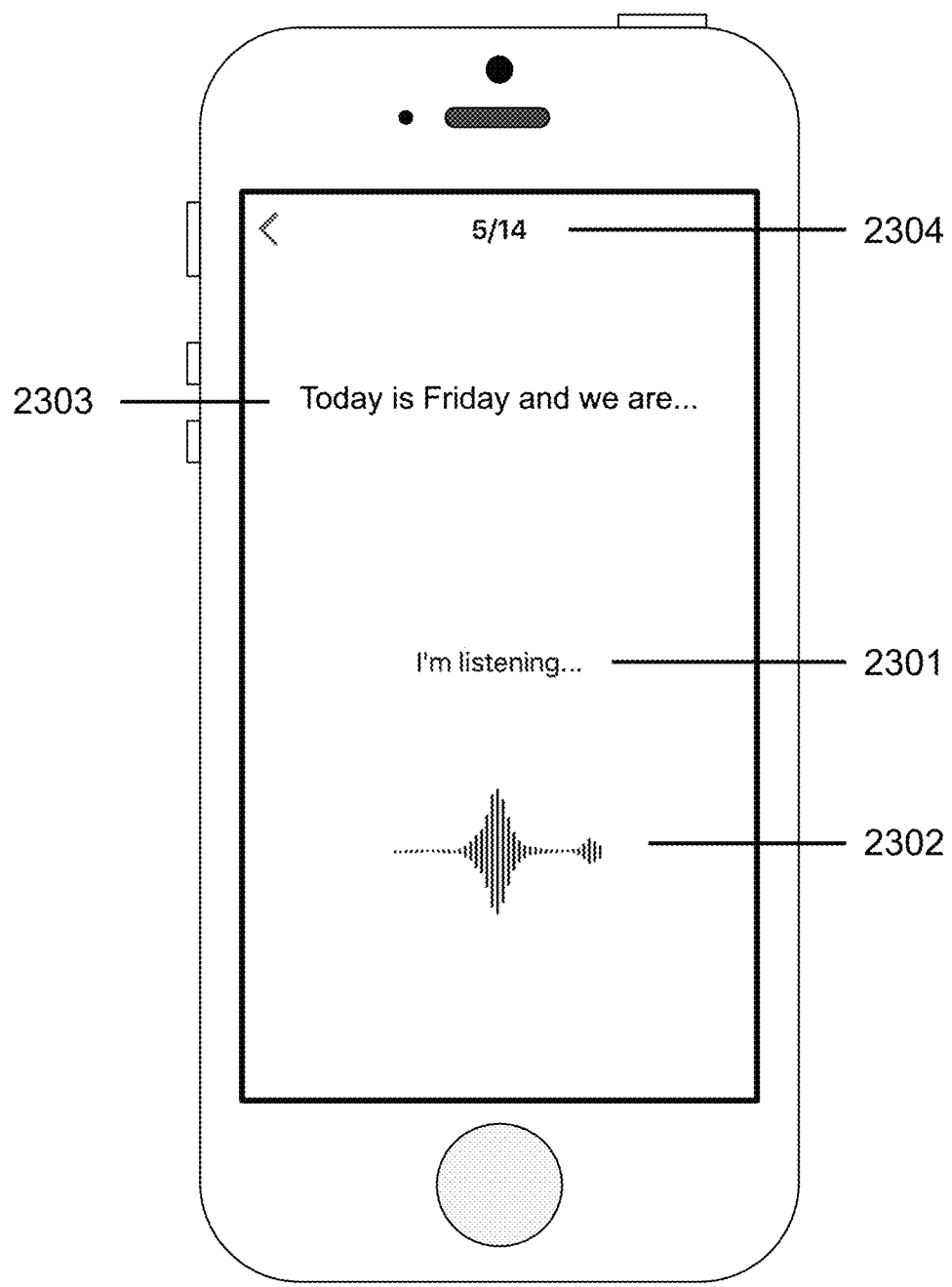
FIG. 23 shows Speech-To-Text Interface for converting speech to text.
Figure 24:
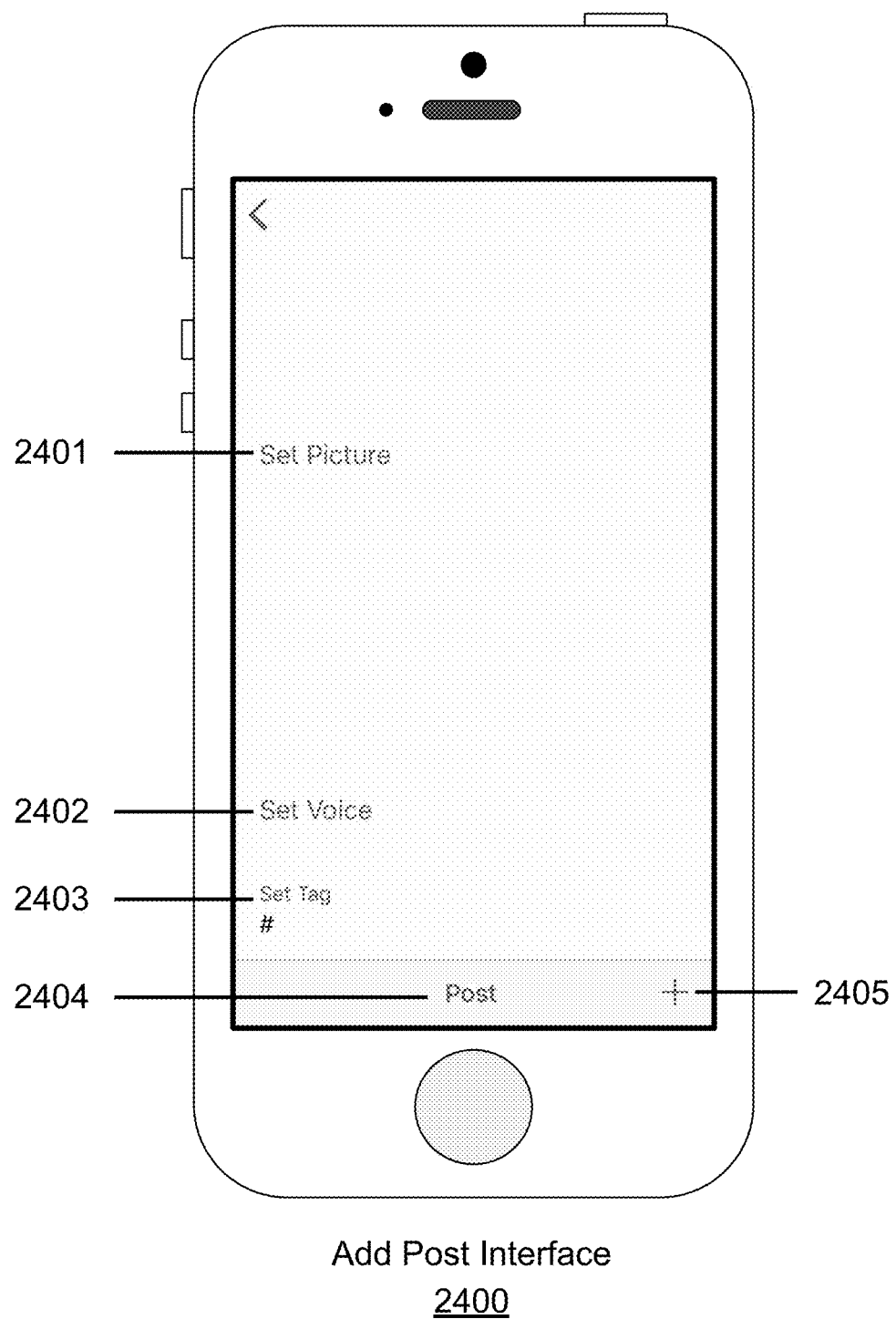

Users can also execute some actions such as viewing detailed information about messages using the detail button, or compose new messages using the compose button. Users can also send voice messages using Speech-To-Text Interface as shown in FIG. 23.

Connection Interface

Another feature about this voice-based social network is Connection Interface 3900 where users can make connections such as Friends 3903, Following 3904, Follower 3905, Networks 3906, Interests 3907, and Groups 3908. For example, users can add, delete, search friends in Friend Interface, following objects or entities in Following Interface, followers in Followers Interface, groups in Group Interface, interests in Interest Interfaces and network in Connection Network Interface. Users can also rate connections using Connection Rate Interface.

Another novel feature about this invention is that users can view and search connection history in History Interface. When a user visits another user's profile page, the user can send a friend request using a voice post.

Profile Interface

Profile Interface provides users ability to add voice posts. FIG. 29 shows a Profile Interface 2900 containing setting button 2901, profile picture 2902, full-name 2903, username 2904, verified icon 2905 (For email-based verification, for example david@mit.edu), Add post button 2906, and list of added post 2907. To make a simple and usable interface, we are using various innovative navigation and interaction. "Preferred embodiment" means best usable user interface.

Figure 2:
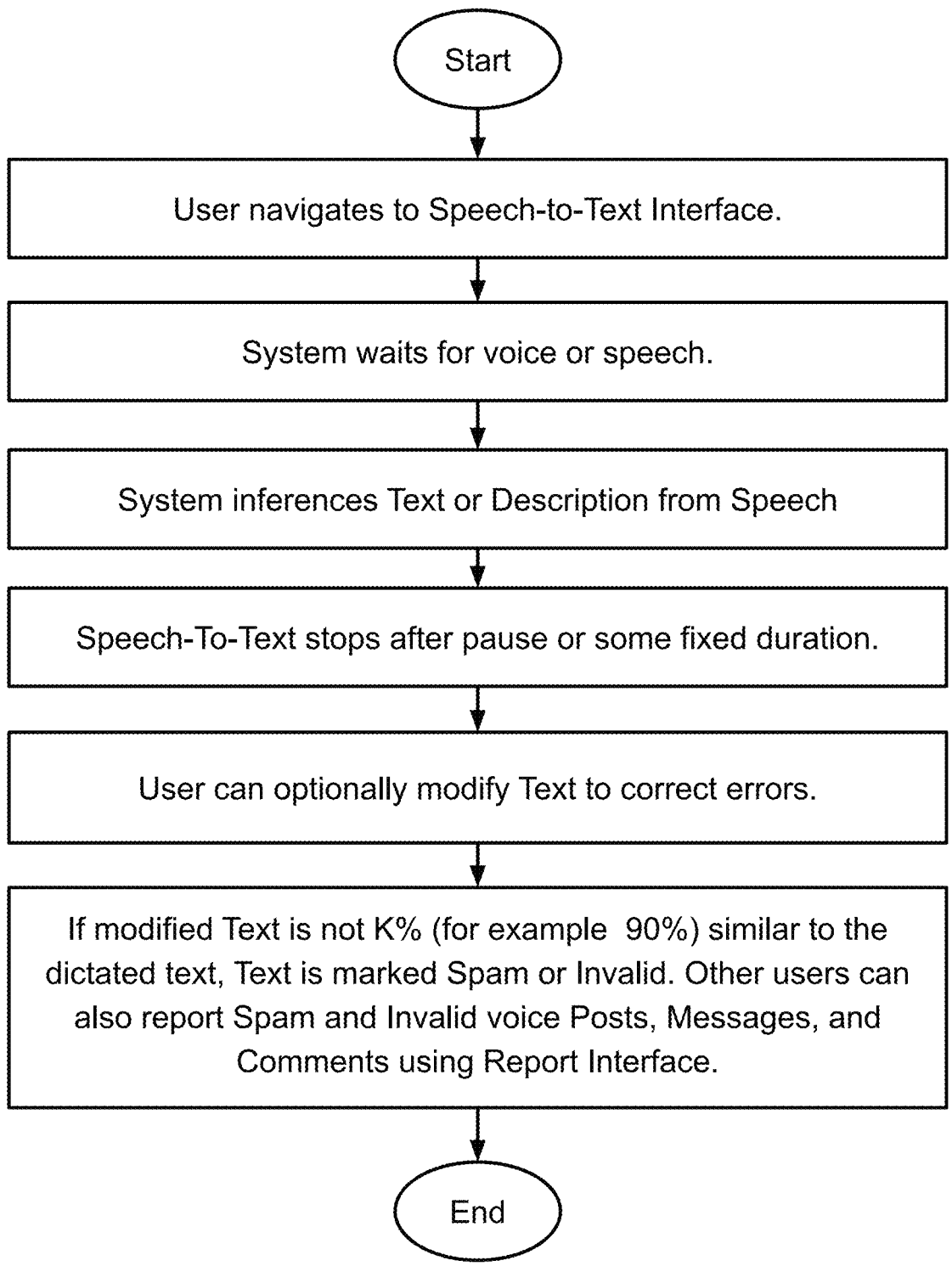
FIG. 2 shows a flowchart for generating text from voice using Speech-To-Text Interface and correcting errors using Input Text Interface.
Figure 3:
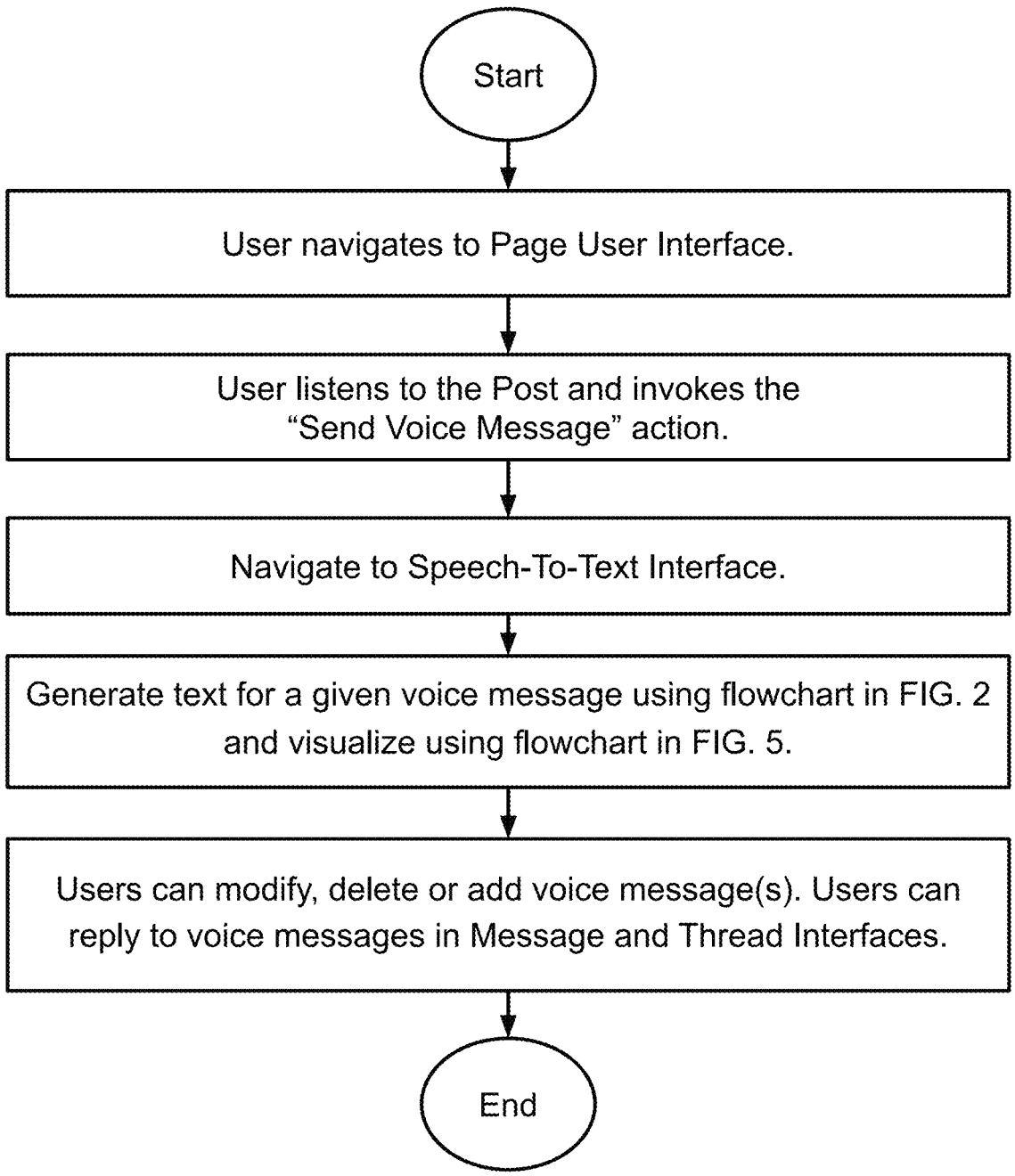
FIG. 3 shows a flowchart for voice messaging.
Figure 4:
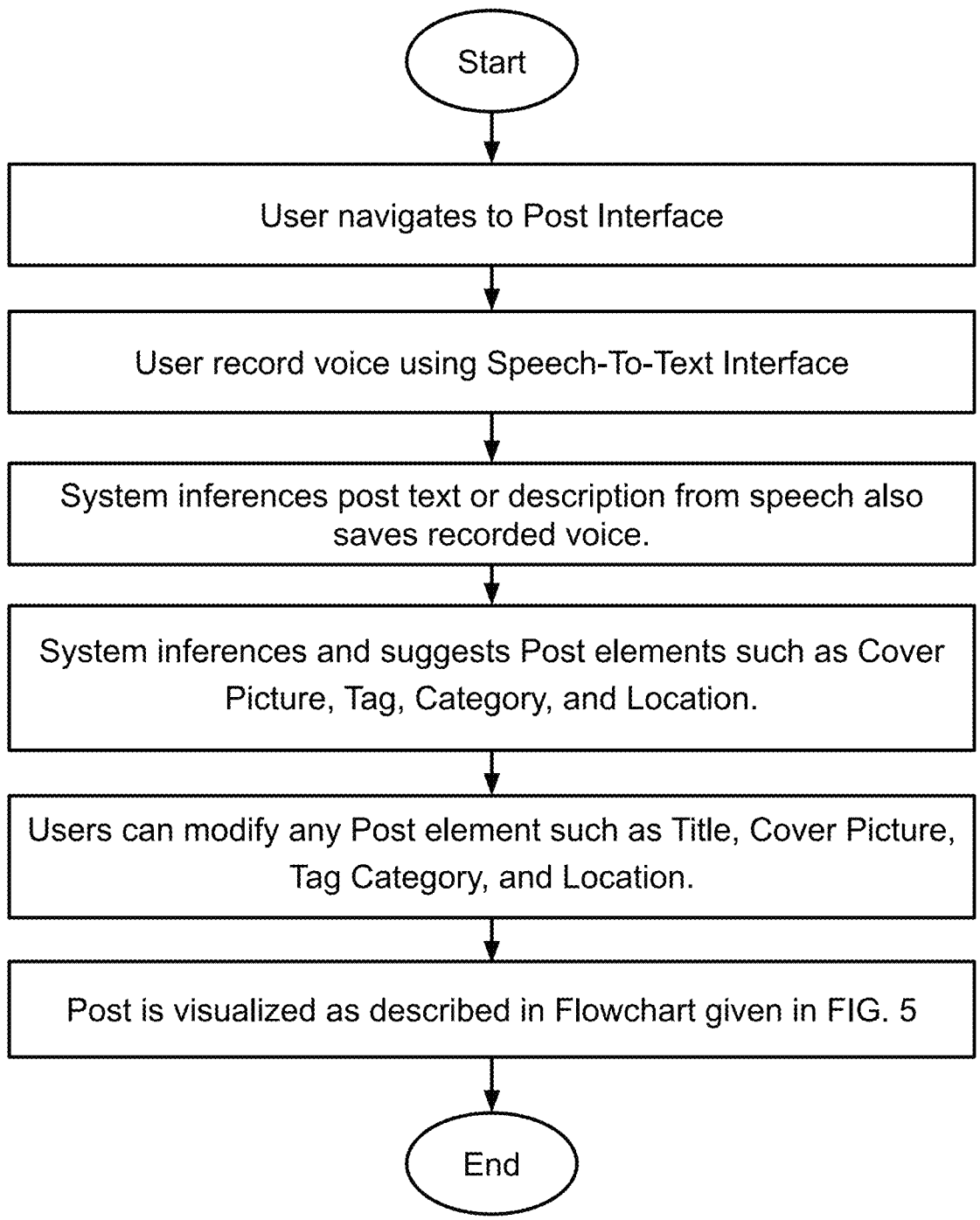
FIG. 4 shows a flowchart for adding a voice post on Add Post Interface.
Figure 5:
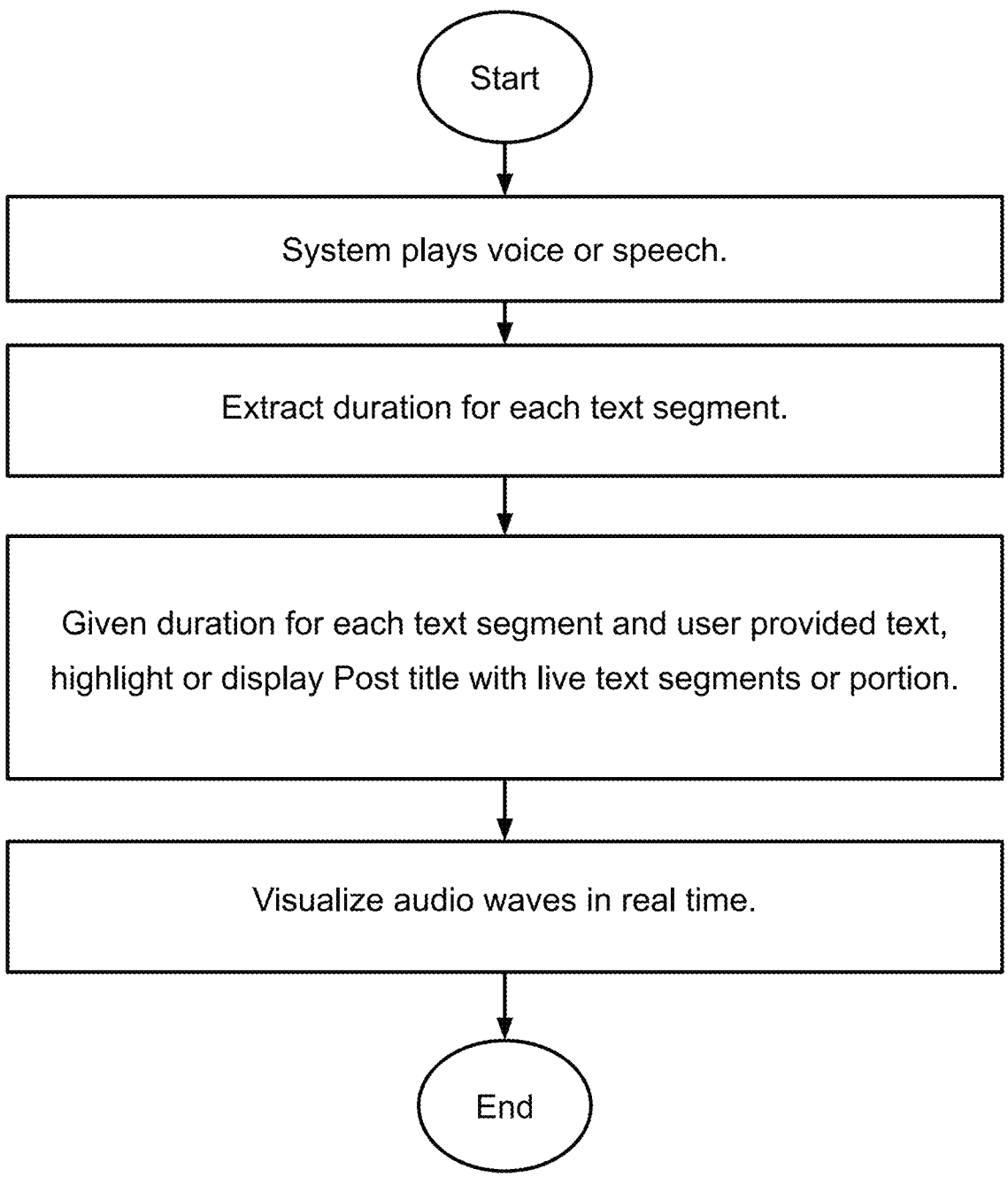
FIG. 5 shows a flowchart for text visualization for a given speech.
Figure 6:
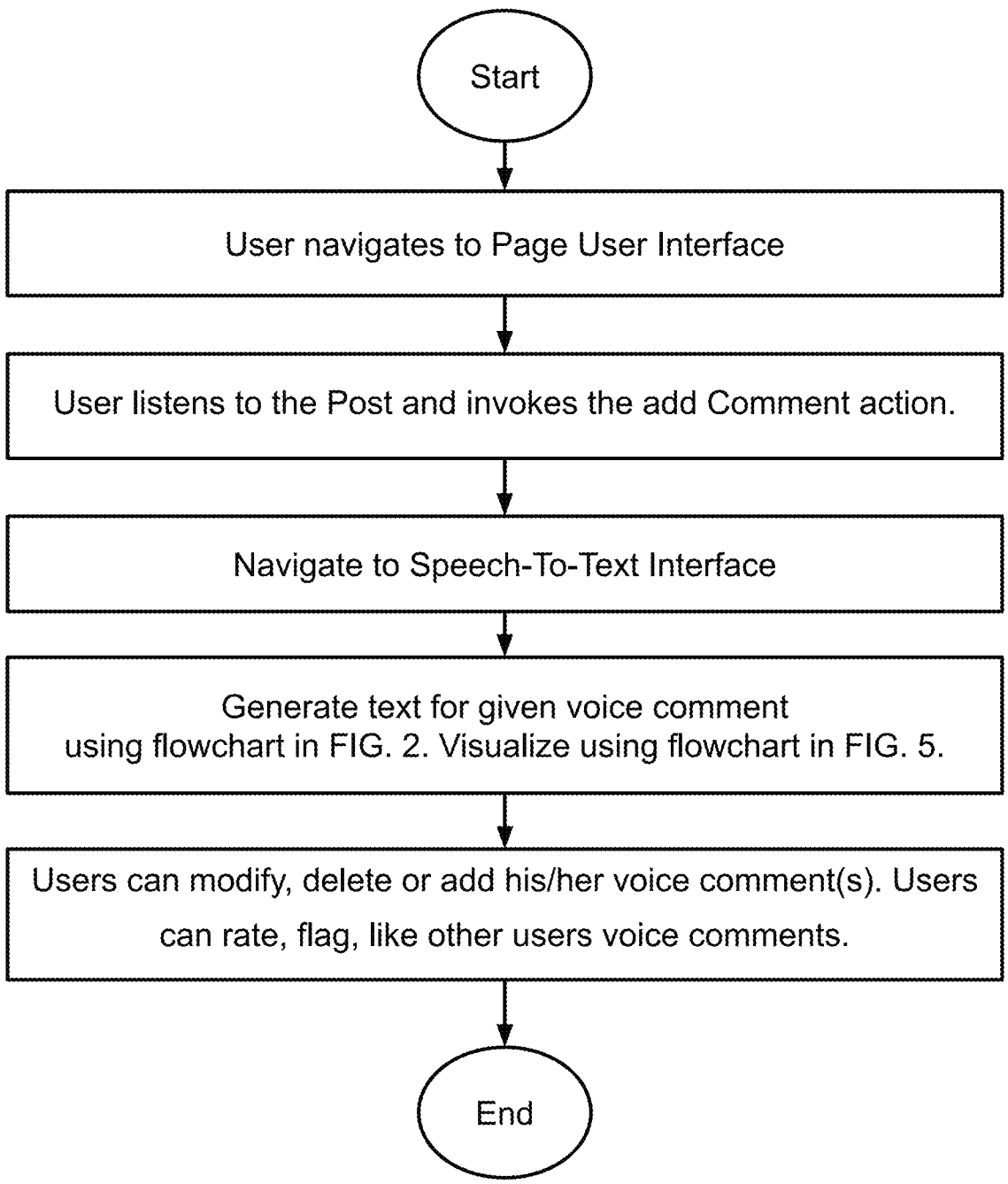
FIG. 6 shows a flowchart for voice commenting.
Figure 7:
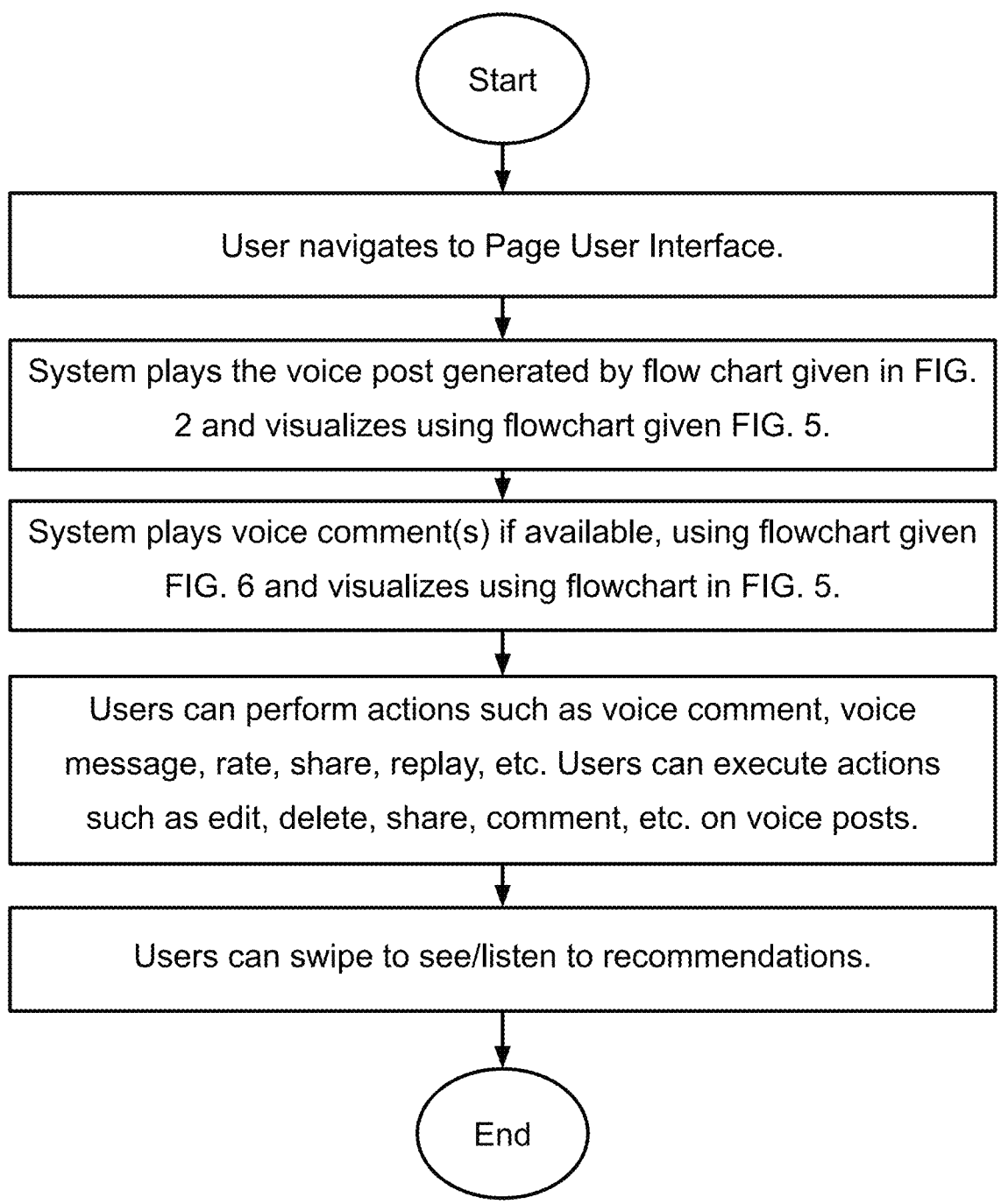
FIG. 7 shows a flowchart for user interaction on Page Interface.

In a preferred embodiment, after clicking on the Add post button, the user is navigated to Add Post Interface 2400 which contains basic inputs such as picture input interface 2401, voice input 2402 and category input 2403. Text/Description Input is hidden, and is available after the Speech-To-Text process. Users can add Voice by clicking 2402 link "Set Voice", and navigating to Speech-To-text Interface 2300 as shown in FIG. 23 containing translated sentence 2303, hint label as "I'm listening" 2301, wave animation 22302 and timer 2304. In some embodiments we can just show timer and wave animation. Flowchart shown in FIG. 2 shows basic interaction on Speech-To-Text Interface. In a preferred embodiment, to keep consistent voice with matched dictation (transcription), value of K is chosen higher such as 90% -99%.

Figure 25:
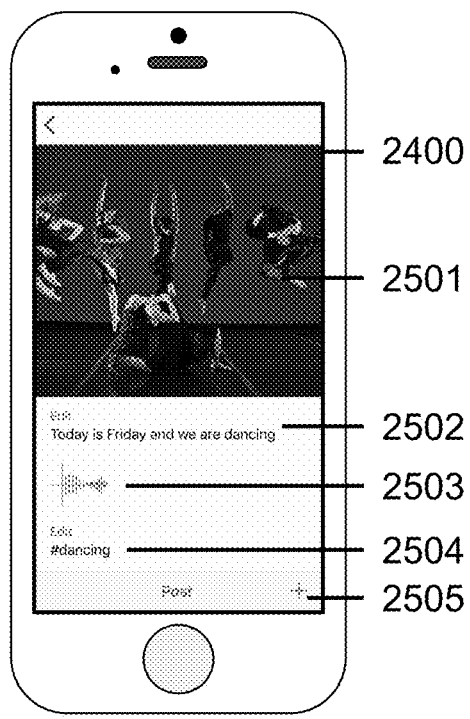
FIG. 25 shows Add Post Interface to add a voice post.
Figure 26:
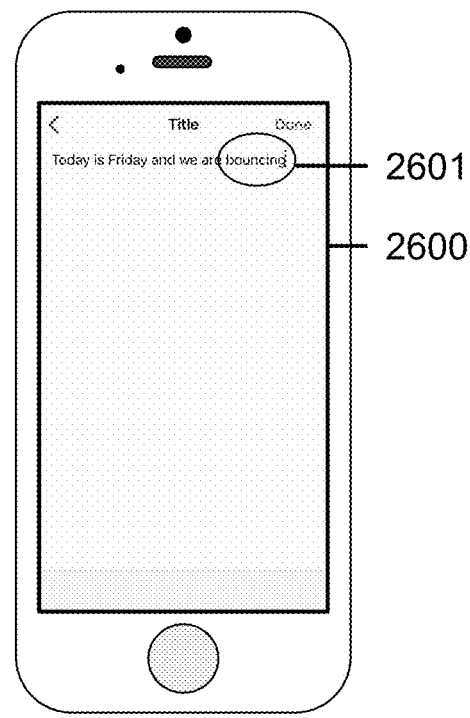
FIG. 26 shows Speech-To-Text Interface with errors.

In some embodiments, K can be lower, Speech-To-Text detection is not available for particular language or device. After text generation, the user interface navigates back to Add Post Interface 2400 where users can edit text using Input Text/Description 2502 to correct any dictated (transcribed) text. A visualization of audio/voice 2503 is rendered on Add Post Interface 2400 as shown in FIG. 25. Speech-To-Text Interface 2300 also renders wave-based animation or visualization 2302 and text 1703. Speech-To-Text can be implemented using existing available third-party SDK or tools. For instance, for iOS devices we can use AVFoundation and Speech framework. Users can optionally add pictures using Input Cover Picture Interface 1801.

In some embodiment systems can generate synthetic real speech directly from text (user post status) using advanced machine learning based Text-To-Speech techniques. In this approach we can build a ML model using training data of the user's actual voice posts.

Figure 9:
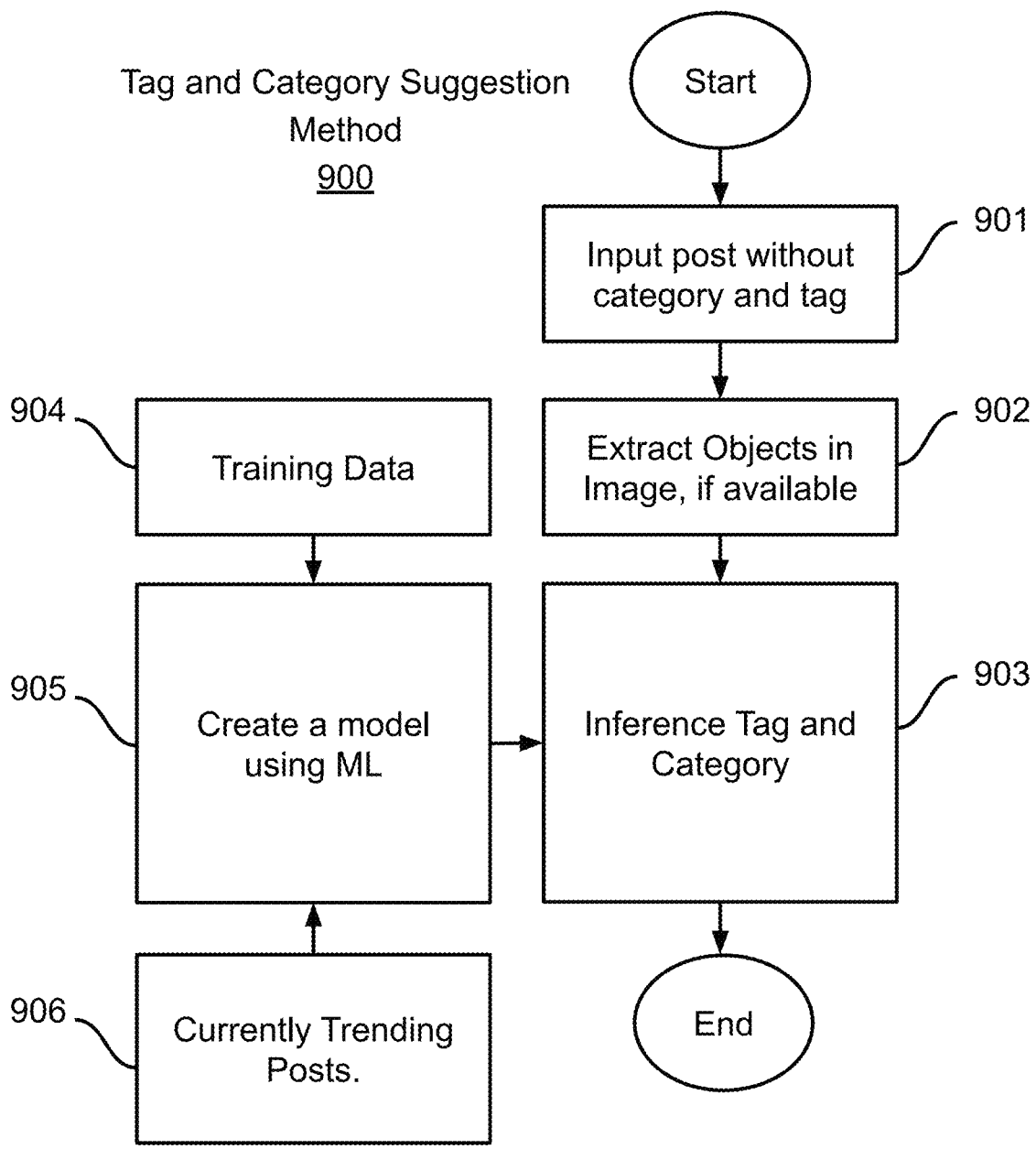
FIG. 9 shows a flowchart for tag and category suggestion or inference.
Figure 27:
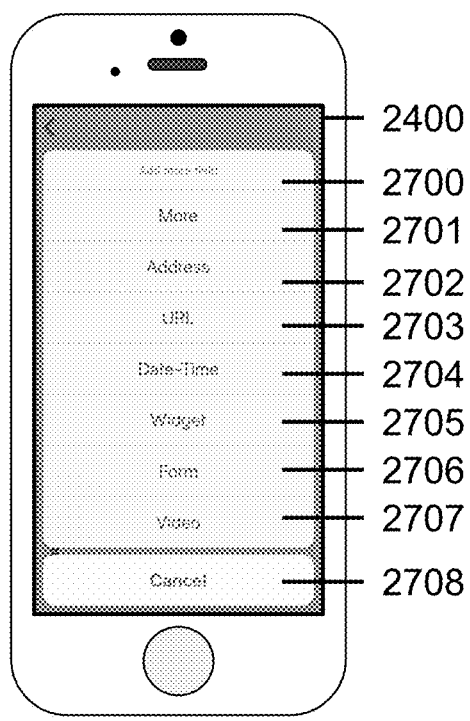
FIG. 27 shows an action sheet to add Advance Input Interfaces.
Figure 28:
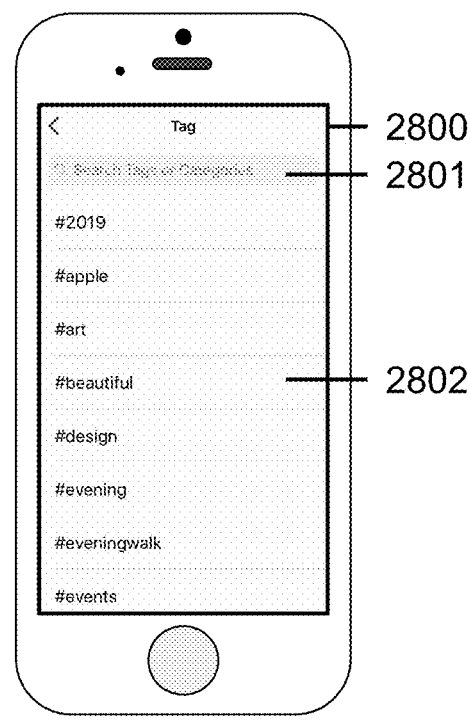
FIG. 28 shows Tag and Category Interface.

After this, the system generates a tag or category using flowchart given in FIG. 9. For example, in FIG. 25, system generates "#dancing" tag from title/description. User can also modify his tag using Tag and Category 2802 Input Interface as shown in FIG. 28. Users optionally add other additional fields such as Video 2708, File, Contact, Form 2706, Widget 2705, URL 2703, Address etc. using the action sheet shown in FIG. 27. Action sheet can be invoked using "+" or add a field button as shown in FIG. 18 Any field can be modified in edit mode.

Figure 8:
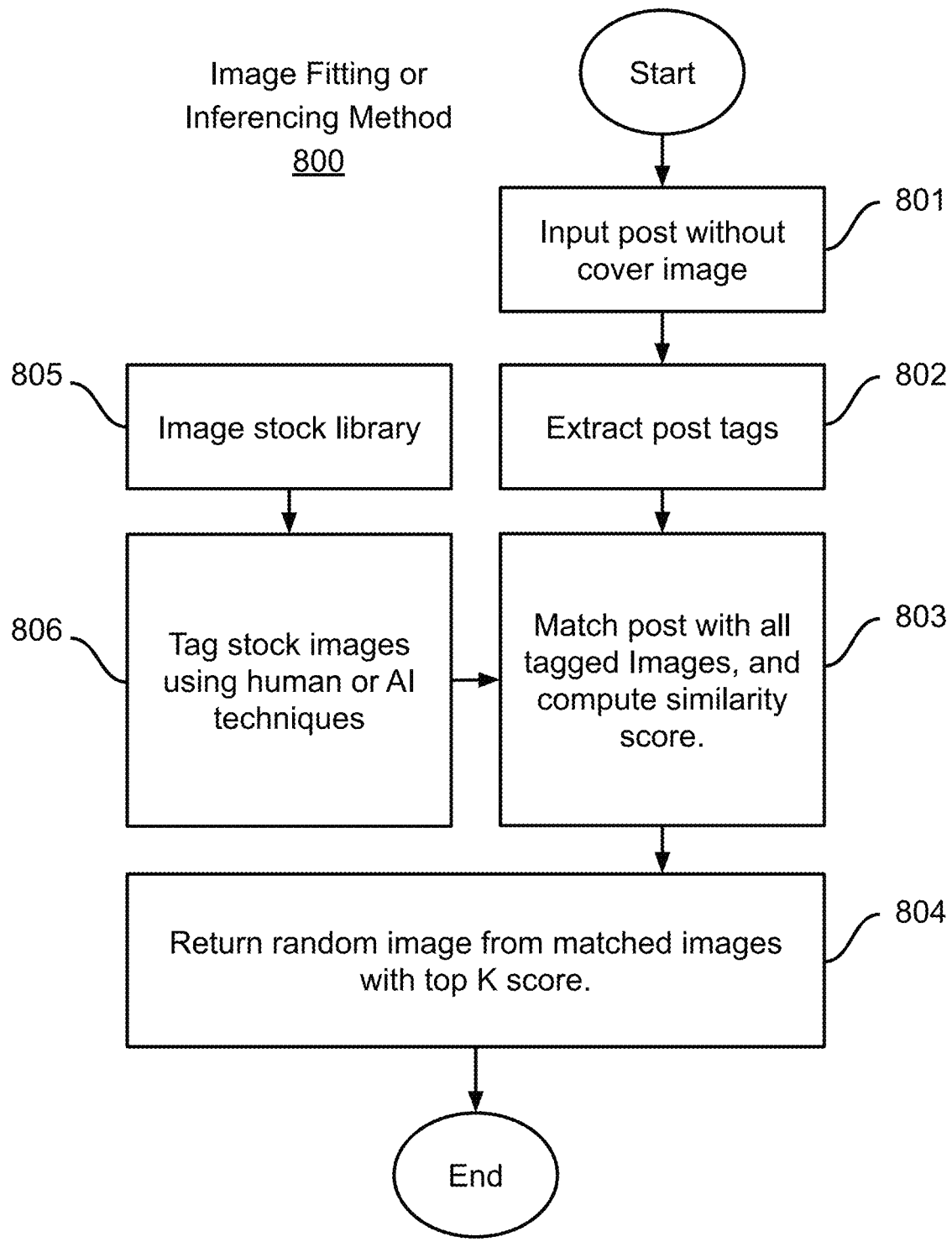
FIG. 8 shows a flowchart for image fitting or inference algorithm.

In some embodiments users can directly add video (audio) in instead of picture or voice. In some embodiments, if the Speech-To-Text feature is not available on device, users can directly add voice and related text from Add Post Interface. In some embodiments, cover picture is inferenced using flowchart shown in FIG. 8.

Figure 30:
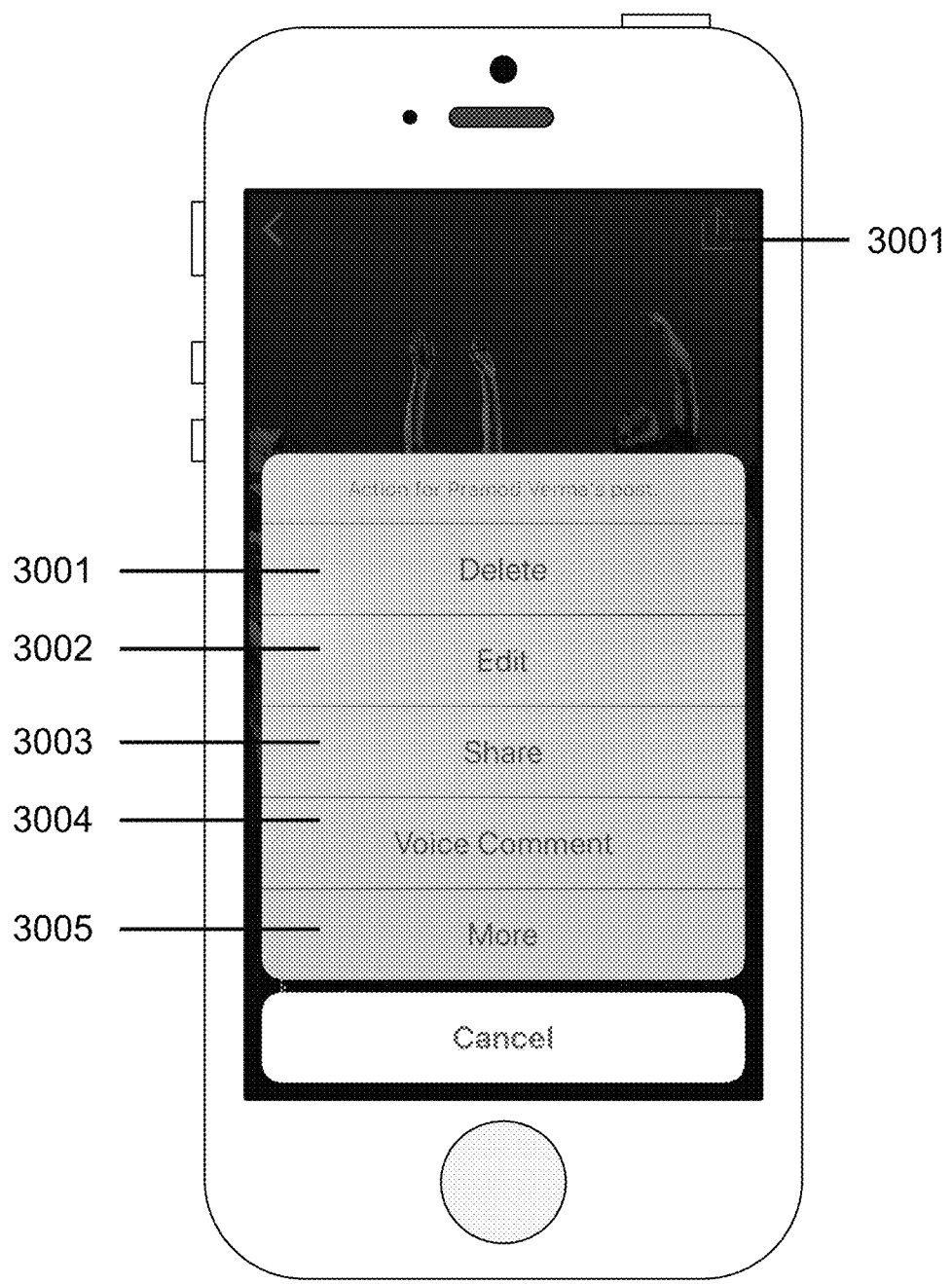
FIG. 30 shows Action Interface on Page Interface where users can perform actions such as edit, delete, share, report, etc.
Figure 31:
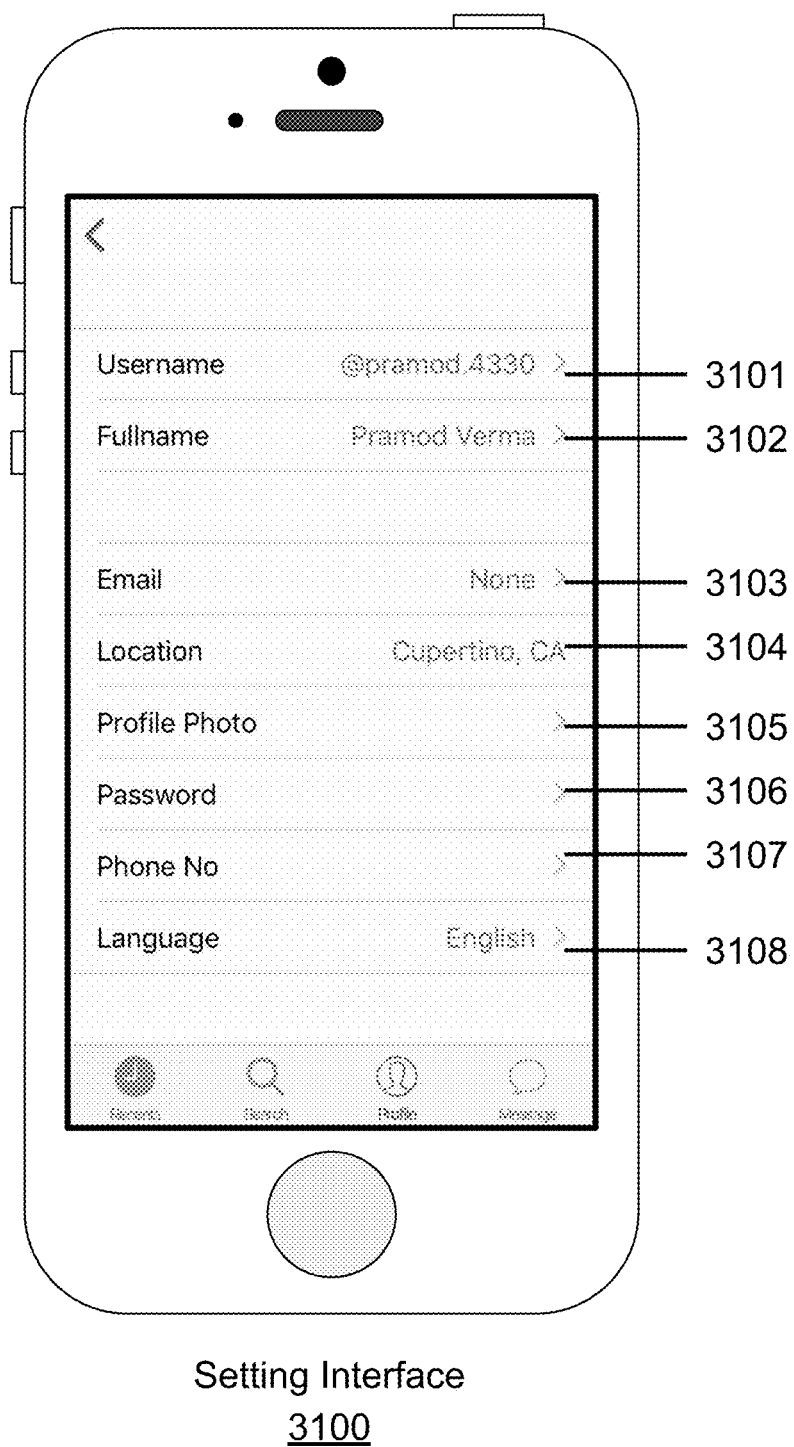
FIG. 31 shows Setting Interface.

After post submission, information is added into the search index, and is rendered on Page Interface as shown in FIGS. 22 and 30. Users can perform actions 3001-3105 such as delete, edit, share, voice comment, etc. as shown in FIG. 20. Add Post Interface may also contain some additional or advanced input.

In some embodiments, users can apply voice and image filters before sharing voice posts. For example, users can change tone, hide stop words or particular words in their speech. In some embodiments, users can add more detail about profile such as age, education, about, website, etc. In some embodiments, users can also add an introductory voice message for other public or private users.

Advertisement Interface

Users can use Advertisement Interface for putting ads in the search index with option to set payment information 2302, and create ad post for available search categories 2301, bill and purchases 2303, and analytics and ads reports 8204 as shown in FIG. 23. Users can create new ads by setting goals, interests and categories, budget, and life span using Create Advertisement Interface which can be navigated from Advertisement Interface.

Advertisement Interface can be used to set options for "Paid Category". In some embodiments, ads can be directly posted using the existing Add Post Interface with current advertisement settings. For example, if user want to post an information in "/real-estate" category or "#jobs" tag, then the system may provide an alert for "Paid Category" and redirect users to set an Ad account for a given category. In some embodiments, Store and Payment Interface can be included in the Application for in-App-Purchase.

Computational Aesthetics

In addition to information visualization and image fitting methods as described in Page Interface section, layout system renders page information using computational aesthetics method for selecting text-color for Page Interface 2200 as shown in FIG. 22. An example of layout for Page Interface 2200 on a tablet device with matched white text-color and background is shown in FIG. 22. To provide a fresh experience every day, the system also uses computational aesthetics methods for changing wallpaper for Home, Welcome, and Explore User Interfaces as shown in FIGS. 11 and 12. In some embodiments, systems may have background sound or voice-based assistant to provide useful navigation and helpful information.

Although the invention has been explained in relation to its preferred embodiment, it is to be understood that many other possible modifications and variations can be made without departing from the spirit and scope of the invention. It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

The invention claimed is:

1. A voice-based social networking system, leveraging voice-only posts, where each post is augmented with voice-over and automatically generated or inferred related elements, including images, hashtags, and text transcriptions from speech using Artificial Intelligence/Machine Learning (AI/ML), operating on one or more interconnected computing devices via network interfaces, comprising:
   (a) a user interface system module executing on client devices, the user interface configured to send and receive data from an Application Programming Interface (API) module and an object server, further comprising:
      i. a signup interface;
      ii. a recent feed interface for displaying recent voice posts;
      iii. an explore interface for performing search queries;
      iv. a search results interface for displaying search outcomes;
      v. a post visualization interface for viewing individual voice posts;
      vi. a comment interface for displaying voice comments;
      vii. a profile interface for viewing a user's post feed;
      viii. an add-post interface for creating new voice posts;
      ix. a messaging interface;
      x. a notification interface for displaying notifications; and
      xi. a settings interface;
   (b) an Application Programming Interface (API) server module, configured to send and receive data from a social-graph and database server module and a data processor module, and to provide endpoints to client devices;
   (c) an object server module, configured to send and receive object data, including video, audio, files, and images, from the user interface module and data processor;
   (d) a social-graph and database server module, configured to store and retrieve processed data from the Application Programming Interface (API) module and data processor module, maintaining social graph information and other relevant data in the database; and
   (e) a data processor module, configured to exchange data with the social-graph and database module, the Application Programming Interface (API) server module, and the object server module.

2. The voice-based social networking system of claim 1, wherein the user interface system further comprises:
   (a) a connection interface for managing friends, followers, following, interests, networks, and location; and
   (b) a connection history interface for analyzing past interactions and connections.

3. The voice-based social networking system of claim 1, wherein the search interface further comprises:
   (a) an action interface for the page, enabling filtering, sorting, group actions, changing views, and playing voice or video posts;
   (b) a filter interface for refining search results to display voice posts;
   (c) a sort interface for organizing search results based on voice posts; and
   (d) a group interface for executing group actions on search results, including the option to play all voice posts.

4. The voice-based social networking system of claim 1, wherein the signup interface further comprises:
   (a) a login interface that navigates to a home or tab interface;
   (b) a guest interface for guest login;
   (c) a signup interface for creating a new account using basic user information, including username, full name, password, network, location, about, contact details, and address;
   (d) a network interface for selecting the user's public/private network and location settings; and
   (e) a reset password interface, along with links to account related information.

5. The voice-based social networking system of claim 1, wherein the recent interface further comprises:
   (a) recently added voice posts, tags, and categories, with or without voice wave visualization; and
   (b) a query interface for making searches using keywords and navigating to the search interface.

6. The voice-based social networking system of claim 1, wherein the search interface further comprises:
   (a) a query interface for searching with keywords and navigating to the search interface;
   (b) a search results interface displaying voice posts based on the query, with navigation to the page interface;
   (c) a page interface displaying page information, including layout, visualization of voice waveforms, and animations of augmented voice with transcribed or dictated post titles and voice comments; and
   (d) an action interface for the page, providing actions including voice comment, send voice message, share, save, like, rate, replay/play voice/video, report, widget actions, and form actions.

7. The voice-based social networking system of claim 1, wherein the page interface further comprises:
   (a) a page layout featuring visualization of the voice waveform, animation of augmented voice with dictated or transcribed post titles, and voice comments; and
   (b) an action interface providing actions on the page, including voice comment, send voice message, share, save, like, rate, replay/play voice/video, report, widget actions, and form actions.

8. The voice-based social networking system of claim 1, wherein the profile interface further comprises:
   (a) a posts interface displaying the user's voice posts based on queries, with navigation to the page interface;
   (b) a button for adding a new post, navigating to the add-post interface to create a new voice post; and
   (c) an action interface providing actions for the user's voice posts, including share, edit, delete, and view statistics.

9. The voice-based social networking system of claim 1, wherein the add-post interface further comprises:
   (a) a basic input interface for entering a title/description, cover picture, voice, category/tag, and settings, including language, privacy, and location;
   (b) a speech-to-text interface for dictating or transcribing user speech, with navigation from the add-post interface, and saving the voice input;
   (c) an input text interface for editing or correcting errors in the text generated by the speech-to-text interface; and
   (d) an action interface providing actions for the user's voice post, including share, edit, delete, and view statistics.

10. The voice-based social networking system of claim 1, wherein the message interface further comprises:
    (a) a list of voice messages, with navigation to a thread interface containing voice message threads;
    (b) a thread interface displaying communication threads for a given voice post;
    (c) a compose interface within the thread, allowing users to compose messages using a speech-to-text interface with an option to correct errors via an input text interface; and
    (d) a link to the related post on the page interface through the thread interface.

11. The voice-based social networking system of claim 1, wherein the settings interface further comprises:
    (a) an option to update user information, including username, full name, password, link or website, age, and profile photo;
    (b) a navigation option to advanced settings interfaces;
    (c) a navigation option to the notification interface;
    (d) a navigation option to the language settings interface;
    (e) a navigation option to the logout button;
    (f) a navigation option to the delete or deactivate account button;
    (g) an option to change or customize the voice wave animation; and
    (h) an advanced settings interface providing navigation to legal settings and additional advanced options.

12. The voice-based social networking system of claim 1, wherein the user interface further comprises a statistics interface for displaying visitor information for posts added to the search index.

13. The voice-based social networking system of claim 1, wherein the user interface further comprises:
    (a) an advertisement interface for placing ads in the search index, with an option to set payment information and create ad posts for available search categories; and
    (b) a payment and store interface for in-app purchases.

14. The voice-based social networking system of claim 1, wherein the comment interface further comprises:
    (a) a search interface for searching comments;
    (b) an action interface for interacting with comments;
    (c) a visualization of comments in the form of voice posts, with navigation to the post page; and
    (d) a user interface for viewing additional comments.

15. The voice-based social networking system of claim 1, wherein the add-post interface further comprises:
    (a) a file input interface;
    (b) a video input interface;
    (c) a 3D input interface;
    (d) a map input interface;

(e) a form input interface;
(f) a Uniform Resource Locator (URL) input interface; and
(g) a contact input interface.

16. The voice-based social networking system of claim 1, wherein the page interface further comprises a recommendation interface for providing recommended voice posts for a given voice post.

17. The voice-based social networking system of claim 1, wherein the Artificial Intelligence/Machine Learning (AI/ML) module is configured to support multi-language support for posting a voice post in any language of choice.

18. The voice-based social networking system of claim 1, wherein the data server is further configured to execute an image fitting algorithm.

19. The voice-based social networking system of claim 1, wherein the data server is further configured to infer missing information, including tags (hashtags), and categories.

20. The voice-based social networking system of claim 1, wherein the system is configured to detect spam by error correction and identifying discrepancies between user-edited transcribed text and the original audio.

\* \* \* \* \*